(12) United States Patent
Kryzak et al.

(10) Patent No.: US 6,812,870 B1
(45) Date of Patent: Nov. 2, 2004

(54) ENHANCED 8B/10B ENCODING/DECODING AND APPLICATIONS THEREOF

(75) Inventors: Joseph Neil Kryzak, Ames, IA (US); Charles W. Boecker, Ames, IA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 10/660,191

(22) Filed: Sep. 11, 2003

(51) Int. Cl.$^7$ ............................................... H03M 7/00
(52) U.S. Cl. ......................................... 341/95; 341/58
(58) Field of Search ..................................... 341/95, 58

(56) References Cited

U.S. PATENT DOCUMENTS 4,486,739 A     12/1984   Franaszek et al.
5,304,997 A  *   4/1994   Konno .......................... 341/95

OTHER PUBLICATIONS

U.S. patent application Ser. No. 10/660,234, Boecker, filed Sep. 11, 2003.
U.S. patent application Ser. No. 10/660,449, Cory et al., filed Sep 11, 2003.
U.S. patent application Ser. No. 10/659,972, Shafer, filed Sep. 11, 2003.
U.S. patent application Ser. No. 10/660,062, Groen et al., filed Sep. 11, 2003.
U.S. patent application Ser. No. 10/660,448, Groen et al., filed Sep. 11, 2003.
U.S. patent application Ser. No. 10/659,803, Black et al., filed Sep. 11, 2003.
U.S. patent application Ser. No. 10/659,819, Groen et al., filed Sep. 12, 2003.
U.S. patent application Ser. No. 10/659,971, Boecker et al., filed Sep. 11, 2003.
U.S. patent application Ser. No. 10/660,254, Groen et al., filed Sep. 11, 2003.
U.S. patent application Ser. No. 10,661,016, Groen et al., filed Sep. 11, 2003.
U.S. patent application Ser. No. 10/659,979, Kryzak et al., filed Sep. 11, 2003.
U.S. patent application Ser. No. 10/659,974, Kryzak et al., filed Sep. 11, 2003.
U.S. patent application Ser. No. 10/660,159, Groen et al., filed Sep. 11, 2003.
U.S. patent application Ser. No. 10/660,016, Jenkins, filed Sep. 11, 2003.
U.S. patent application Ser. No. 10/659,973, Groen et al., filed Sep. 11, 2003.
U.S. patent application Ser. No.10/660,190, Groen, filed Sep. 11, 2003.
U.S. patent application Ser. No. 10/659,916, Black et al., filed Sep. 11, 2003.

(List continued on next page.)

*Primary Examiner*—Brian Young
(74) *Attorney, Agent, or Firm*—Timothy Markison; Justin Liu

(57) ABSTRACT

8b/10b encoding begins when an input running disparity is received. The processing then continues by receiving an 8-bit digital input that includes a 5-bit digital input portion and a 3-bit digital input portion. The processing then continues by determining, in parallel, a 6-bit running disparity and a 4-bit running disparity. The processing then continues by determining a 6-bit digital output based on the 6-bit running disparity and the 5-bit digital input portion. The processing then continues by determining a 4-bit digital output based on the 4-bit running disparity and the 3-bit digital input portion. The resulting 10-bit encoded digital output is the combination of the 6-bit digital output and the 4-bit digital output.

45 Claims, 11 Drawing Sheets

OTHER PUBLICATIONS

U.S. patent application Ser. No. 10/659,978 Groen et al., filed Sep. 11, 2003.

U.S. patent application Ser. No. 10/660,235, Boecker et al., filed Sep. 11, 2003.

U.S. patent application Ser. No. 10/659,966, Chuang et al., filed Sep. 11, 2003.

U.S. patent application Ser. No. 10/660,243, Shafer et al., filed Sep. 11, 2003.

* cited by examiner

Figure 1 programmable logic devic 10 programmable MGT 14 - 28 programmable receive PCS module 44 programmable transmit PCS
module 42

8b/10b_ncod_r 124

8b/10b decoder 86

32b/40b encoding

32b/40b decoding functional diagram of 4b and 6b running disparities 146 and 148

ENHANCED 8B/10B ENCODING/DECODING AND APPLICATIONS THEREOF

BACKGROUND OF THE INVENTION

1. Technical Field of the Invention

This invention relates generally to communication systems and more particularly to encoding/decoding of data within such communication systems.

2. Description of Related Art

Communication systems are known to transport large amounts of data between a plurality of end user devices. Such end user devices include telephones, facsimile machines, computers, television sets, cellular phones, personal digital assistants, et cetera. As is also known, such communication systems may be local area networks (LAN) and/or wide area networks (WAN). A local area network is generally understood to be a network that interconnects a plurality of end user devices distributed over a localized area (e.g., up to a radius of 10 kilometers). For example, a local area network may be used to interconnect workstations distributed within an office of a single building or a group of buildings, to interconnect Internet computer based equipment distributed around a factory or hospital, et cetera.

A wide area network is generally understood to be a network that covers a wide geographic area. Wide area networks include both public data networks and enterprise wide private data networks. A public data network is established and operated by a national network administrator specifically for data transmission. Such public data networks facilitate the interworkings of equipment from different manufacturers. Accordingly, standards by the ITU-T have been established for conveying data within public data networks. Currently, there are two main types of public data networks: packet switched public data networks and circuit switched public data networks. For example, the public switched telephone network is a circuit switched public data network while the Internet is a packet switched public data network. Other examples of wide area networks include integrated service digital networks (ISDN) and, broadband multi-service networks.

As is further known, communication systems may be networked together to yield larger communication systems, where such networking is typically referred to as internetworking. Internetworking is achieved via internetworking units that allow communication networks using the same or different protocols to be linked together. The internetworking units may be routers, gateways, protocol converters, bridges, and/or switches.

Regardless of the type of communication system (e.g., LAN, WAN, internetworking LAN and/or WAN), each communication system employs a data conveyance protocol to ensure that data is accurately conveyed within the system. All such data conveyance protocols are based on layers 1, 2, 3, and/or 4 of the open system interconnection (OSI) seven layer reference model. As is known, the layers include a physical layer (layer 1), a data link layer (layer 2), a network layer (layer 3), a transport layer (layer 4), a session layer, (layer 5), a presentation layer (layer 6), and an application layer (layer 7).

In general, a protocol is a formal set of rules and conventions that govern how each end user device and/or data terminal equipment (i.e., the infrastructure equipment of the communication system) exchanges information within the communication system. A wide variety of protocols exist, but can generally be categorized in the one of four types of protocols: a local area network protocol, a wide area network protocol, a routing protocol, or a network protocol. Local area network protocols operate at the physical and data link layers and define communication over various local area network and media. Wide area network protocols operate at the lowest three layers of the OSI model and define communication over the various wide area media. Routing protocols are network layer protocols that are responsible for path determination and traffic switching. Network protocols are the various upper layer protocols that exist in a given protocol suite. Examples of such protocols include asynchronous transfer mode (ATM), frame relay, TCP/IP, Ethernet, et cetera. Typically, such protocols include an encoding/decoding and/or scrambling/descrambling scheme. As is known, an encoding/decoding scheme enhances the reliability of data conveyances by encoding and/or scrambling data to include extra bits with the data to produce a code word. When the code word is received by the corresponding decoder and/or descrambler, it utilizes the extra bits to determine if the data was received without error. If the data was received without error, the decoder and/or descrambler uses the extra bits to determine and subsequently correct the error.

One such coding scheme is 8b/10b encoding, which, in general, takes 8-bits of input data and encodes it into a 10-bit code word. The basic concepts of 8b/10b encoding are disclosed in U.S. Pat. No. 4,486,739 (hereinafter referred to as the "739 Patent"). As taught in the 739 Patent, 8b/10b encoding is done in 2 parts: a 5-bit-to-6-bit part and a 3-bit-to-4-bit part. The 5-bit-to-6-bit part receives 5-bits of the 8-bit input data and a running disparity value. The 5-bit-to-6-bit part converts the 5-bits of input into a 6-bit code word based on the value of the 5-bits of input, the received running disparity, and an expected running disparity. In addition, the 5-bit-to-6-bit part generates an output running disparity for the 6-bit code word based on the value of the 5-bits of input and the received running disparity.

For example, as shown in Table I of the 739 Patent, the 5-bits of input are in the column labeled A, B, C, D & E, the expected running disparity is in the column labeled D-1, the 6-bit output is in the column labeled a, b, c, d, e, & i or the alternate column a, b, c, d, e & i, and the outputted running disparity is in the column labeled D0. For certain values of the 5-bits of input, the expected running disparity column includes an X, indicating a logical don't-care, such that the 5-bits is always converted into the 6-bit code word of column a–i. Further, for such values of the 5-bits of input, the outputted running disparity equals the received running disparity. For instance, a 5-bit input of 10100 is encoded into 101001 and the outputted running disparity equals the received running disparity.

For the remainder of the values of the 5-bits of input, the 6-bit code word is from the lower case a–i column when the received running disparity equals the expected running disparity and the outputted running disparity is positive when the number of 1's is greater than the number of 0's in the 6-bit code word, is negative when the number of 1's is less than the number of 0's in the 6-bit code word, and equals the received running disparity when the number of 1's equals the number of 0's. If, however, the received running disparity does not equal the expected running disparity, the 6-bit code word is selected from the alternate lower case a–i column and the outputted running disparity is inverted. For example, if the 5-bits of input is equal to 00000, and the received running disparity equals the expected running disparity, then the 6-bit code word is 011000 and the outputted running disparity is negative. If, however, for the 5-bits of input equal to 00000, the received running disparity does not equal the expected running disparity, the 6-bit code word is 100111 and the outputted running disparity is positive.

The encoding of the 3-bits of input into a 4-bit code word is shown in Table II and functions in a similar way as the encoding of 5-bits into 6-bits. The received running disparity for the 3-bit-to-4-bit section is the outputted running disparity from the 5-bit-to-6-bit section and the outputted running disparity for the 8b/10b encoder corresponds to the running disparity outputted by the 3-bit-to-4-bit section. The decoding of a 10-bit code word, which is the combination of a 6-bit code word and a 4-bit code word, is shown in Tables IV and V and is essentially the same process as 8b/10b encoding but in reverse.

By utilizing the circuitry illustrated in the 739 Patent to generate the running disparities and implementing such circuitry on an integrated circuit using 0.18 micron CMOS technology, the propagation delay from receiving the running disparity to producing the output running disparity is approximately 5.1 nanoseconds. If the data rate for the 8-bit input is less than 196 megahertz (i.e., 1/5.1 nanoseconds), then the propagation delay to calculate the outputted running disparity is not a limiting factor in 8b/10b encoding. However, the calculation of the running disparity is a limiting factor for data rates over 196 megahertz and thus limits the maximum data rate for 8b/10b encoding utilizing the teachings of the 739 Patent to a maximum of 196 megahertz for an 8-bit input. Thus, if data rates greater than 196 megahertz are to be achieved, the propagation delay for calculating the running disparity must be decreased.

The running disparity calculation propagation delay is also a limitation when 8b/10b encoders are bonded together to achieve 16b/20b encoding, 24b/30b encoding, and/or 32b/40b encoding.

Therefore, a need exists for an improved method and apparatus of 8b/10b encoding/decoding that reduces the running disparity calculation time.

BRIEF SUMMARY OF THE INVENTION

The 8b/10b encoding/decoding of the present invention substantially meets these needs and others. In one embodiment, 8b/10b encoding begins when an input running disparity is received. The processing then continues by receiving an 8-bit input that includes a 5-bit input portion and a 3-bit input portion. The processing then continues by determining, in parallel, a 6-bit running disparity (i.e., the outputted running disparity for the 5-bit to 6-bit part of an 8b/10b encoder) and a 4-bit running disparity (i.e., the outputted running disparity for the 3-bit to 4-bit part of an 8b/10b encoder). The 6-bit running disparity is based on a $1^{st}$ possible 6-bit expected running disparity, a $2^{nd}$ possible 6-bit expected running disparity, the input running disparity, and the 5-bit digital input portion. The 4-bit running disparity is based on the $1^{st}$ possible 6-bit expected running disparity, the $2^{nd}$ possible 6-bit expected running disparity, a $1^{st}$ possible 4-bit expected running disparity, a $2^{nd}$ possible 4-bit expected running disparity, the input running disparity and the 3-bit digital input portion. The processing then continues by determining a 6-bit output based on the 6-bit running disparity and the 5-bit input portion. The processing then continues by determining a 4-bit output based on the 4-bit running disparity and the 3-bit input portion. The resulting 10-bit encoded output is the combination of the 6-bit output and the 4-bit output. With such a method, and apparatus thereof, the calculation time for determining a running disparity is substantially reduced such that data rates in excess of 200 megahertz for 8-bit inputs can be readily achieved.

In another embodiment, parallel 8b/10b encoding may be achieved by initially receiving an N by 8-bit digital input, where the "N" indicates the number of 8b/10b encoders coupled in parallel, or bonded together. The processing continues by performing, in parallel, 8b/10b encoding of N 8-bit input values of the N by 8-bit input based on a plurality of running disparities for the N by 8-bit input. Each of the N 8-bit input values includes a 5-bit input portion and a 3-bit input portion. For example, if N corresponds to 4, such that four 8-bit/10-bit encoders are used, then each 8-bit/10-bit encoding process operates in parallel, with each receiving 8 bits of a 32-bit input. In addition, each 8-bit/10-bit encoding process produces its own running disparity and receives, as its input running disparity, the outputted running disparity from the preceding 8-bit/10-bit encoding process in a daisy-chain manner. The processing then continues by performing, in series, a running disparity calculation for each of the N 8-bit input values to produce the plurality of running disparities for the N by 8-bit digital input. The performing of the running disparity calculation for one of the running disparities includes determining, in parallel, a 6-bit running disparity and a 4-bit running disparity.

In another embodiment, decoding of an 8-bit/10-bit encoded data word begins by receiving a 10-bit encoded data word having a 6-bit section and a 4-bit section. The processing continues by receiving a running disparity. The processing then continues by determining, in parallel, a 6-bit running disparity and a 4-bit running disparity. The process then continues by determining a 5-bit decoded value based on the 6-bit running disparity in the 6-bit section. The processing then continues by determining a 3-bit decoded value based on the 4-bit running disparity in the 4-bit section. The 5-bit decoded value and the 3-bit decoded value provide an 8-bit decoded value.

In another embodiment, a method for parallel 8-bit/10-bit decoding begins by receiving an encoded N by 10-bit input, where N corresponds to the number of 8b/10b decoding processes coupled in parallel. The processing then proceeds by performing, in parallel, 8b/10b decoding of N 10-bit input values of the encoded N by 10-bit input based on a plurality of running disparities. The processing then continues by performing, in series, a running disparity calculation for each of the N 10-bit input values to produce the plurality of running disparities. The performance of a running disparity calculation that produces one of the plurality of running disparities includes determining, in parallel, a 4-bit running disparity and a 6-bit running disparity.

In any embodiment, the 8-bit/10-bit encoding/decoding and/or the parallel 8-bit/10-bit encoding/decoding in accordance with the present invention may be utilized within a multi-gigabit transceiver. Such a multi-gigabit transceiver, or multiple multi-gigabit transceivers, may incorporated in a programmable logic device to provide a high-speed interface that transceive serial data in the multiple giga-bit-per-second (Gbps) range. This speed is achievable, at least in part, because the determination of the 6-bit running disparity and 4-bit running disparity are done in parallel, which substantially reduces the overall calculation time for producing a running disparity.

DETAILED DESCRIPTION OF THE INVENTION

Figure 1:
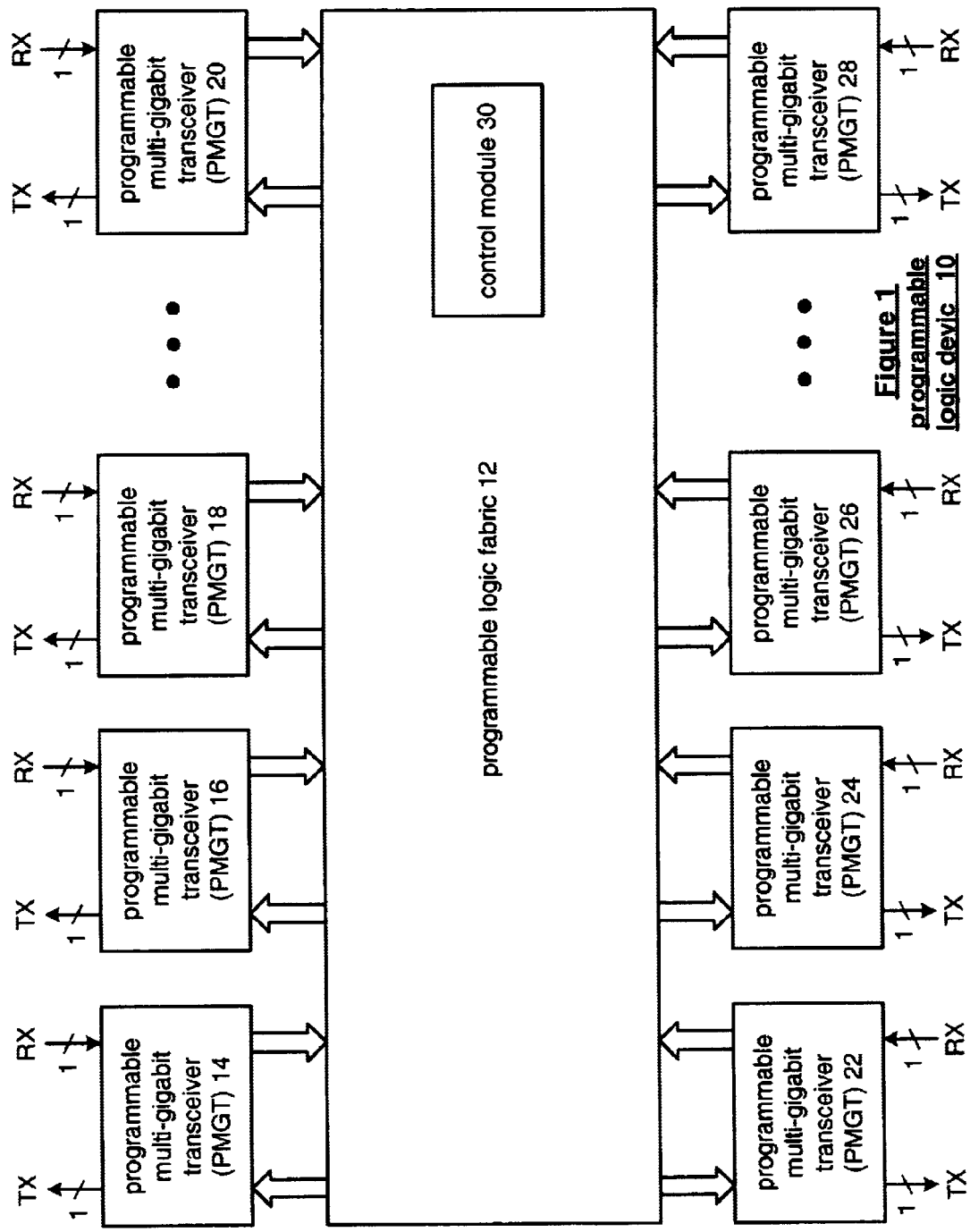
FIG. 1 is a schematic block diagram of a programmable logic device in accordance with the present invention.

FIG. 1 is a schematic block diagram of a programmable logic device 10 that includes programmable logic fabric 12, a plurality of programmable multi-gigabit transceivers (PMGT) 14–28 and a control module 30. The programmable logic device 10 may be, for example, a programmable logic array device, a programmable array logic device, an erasable programmable logic device, and/or a field programmable gate array (FPGA). When the programmable logic device 10 is a field programmable gate array (FPGA), the programmable logic fabric 12 may be implemented as, for instance, a symmetric array configuration, a row-based configuration, a sea-of-gates configuration, and/or a hierarchical programmable logic device configuration. The programmable logic fabric 12 may further include at least one dedicated fixed processor, such as a microprocessor core, to further facilitate the programmable flexibility offered by a programmable logic device 10.

The control module 30 may be contained within the programmable logic fabric 12 or it may be a separate module. In either implementation, the control module 30 generates the control signals to program each of the transmit and receive sections of the programmable multi-gigabit transceivers 14–28. In general, each of the programmable multi-gigabit transceivers 14–28 performs a serial-to-parallel conversion on received data and performs a parallel-to-serial conversion on transmit data. The parallel data may be 8-bits, 16-bits, 32-bits, 64-bits, et cetera wide. Typically, the serial data will be a 1-bit stream of data that may be a binary level signal, multi-level signal, etc. Further, two or more programmable multi-gigabit transceivers may be bonded together to provide greater transmitting speeds. For example, if multi-gigabit transceivers 14, 16 and 18 are transceiving data at 3.125 gigabits-per-second, the transceivers 14–18 may be bonded together such that the effective serial rate is 3 times 3.125 gigabits-per-second.

Each of the programmable multi-gigabit transceivers 14–28 may be individually programmed to conform to separate standards. In addition, the transmit path and receive path of each multi-gigabit transceiver 14–28 may be separately programmed such that the transmit path of a transceiver is supporting one standard while the receive path of the same transceiver is supporting a different standard. Further, the serial rates of the transmit path and receive path may be programmed from 1 gigabit-per-second to tens of gigabits-per-second. The size of the parallel data in the transmit and receive sections, or paths, is also programmable and may vary from 8-bits, 16-bits, 32-bits, 64-bits, et cetera.

Figure 2:
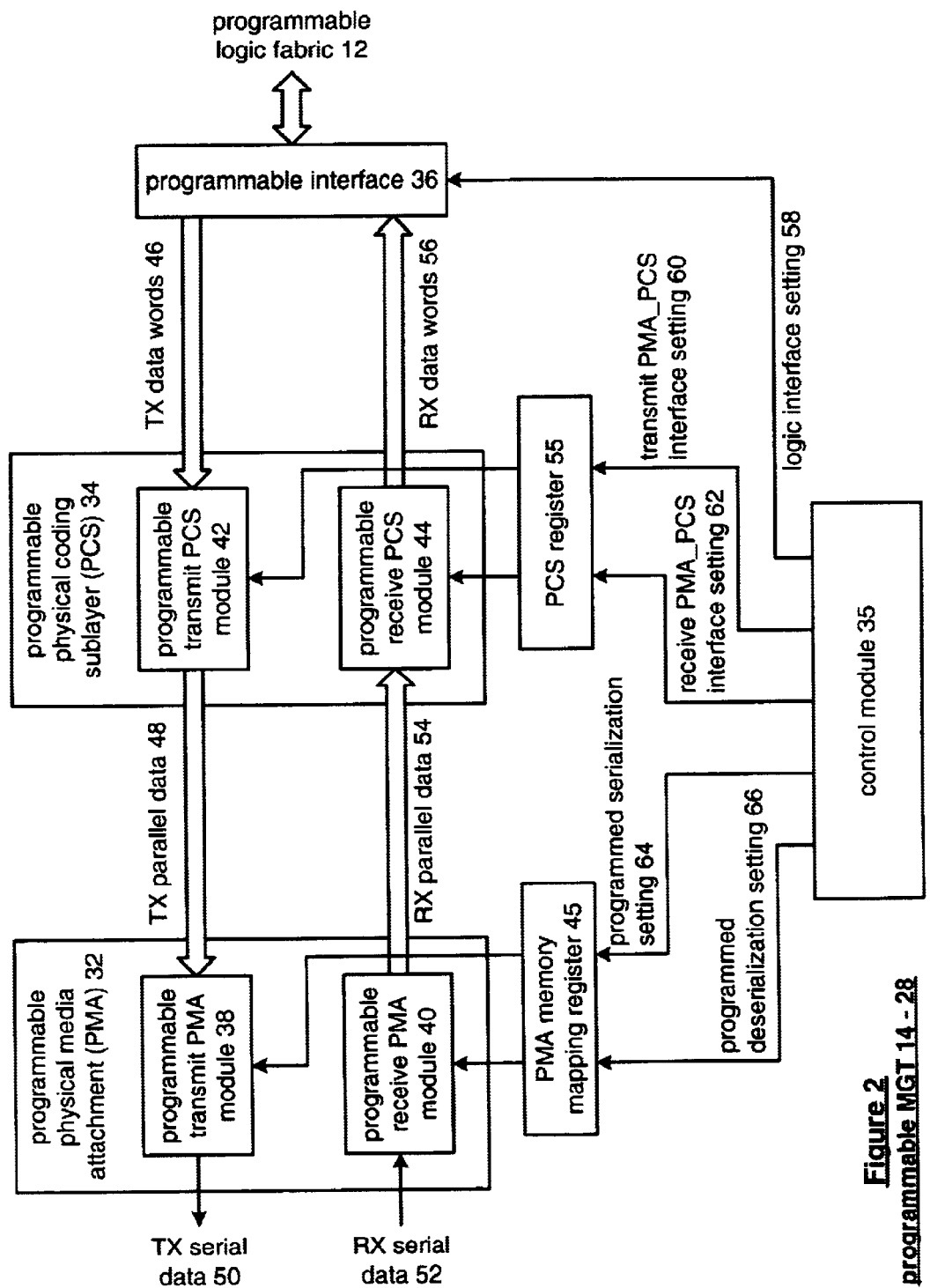
FIG. 2 is a schematic block diagram of a programmable multi-gigabit transceiver in accordance with the present invention.

FIG. 2 is a schematic block diagram of one embodiment of a representative one of the programmable multi-gigabit transceivers 14–28. As shown, the programmable multi-gigabit transceiver includes a programmable physical media attachment (PMA) module 32, a programmable physical coding sub-layer (PCS) module 34, a programmable interface 36, a control module 35, a PMA memory mapping register 45 and a PCS register 55. The control module 35, based on the desired mode of operation for the individual programmable multi-gigabit transceiver 14–28, generates a programmed deserialization setting 66, a programmed serialization setting 64, a receive PMA_PCS interface setting 62, a transmit PMA_PCS interface setting 60, and a logic interface setting 58. The control module 35 may be a separate device within each of the multi-gigabit transceivers and/or included within the control module 30. In either embodiment of the PMGT control module 35, the programmable logic device control module 30 determines the corresponding overall desired operating conditions for the programmable logic device 10 and provides the corresponding operating parameters for a given multi-gigabit transceiver to its control module 35, which generates the settings 58–66.

The programmable physical media attachment (PMA) module 32 includes a programmable transmit PMA module 38 and a programmable receive PMA module 40. The programmable transmit PMA module 38 is operably coupled to convert transmit parallel data 48 into transmit serial data 50 in accordance with the programmed serialization setting 64. The programmed serialization setting 64 indicates the desired rate of the transmit serial data 50, the desired rate of the transmit parallel data 48, and the data width of the transmit parallel data 48. The programmable receive PMA module 40 is operably coupled to convert receive serial data 52 into receive parallel data 54 based on the programmed deserialization setting 66. The programmed deserialization setting 66 indicates the rate of the receive serial data 52, the desired rate of the receive parallel data 54, and the data width of the receive parallel data 54. The PMA memory mapping register 45 may store the serialization setting 64 and the deserialization setting 66.

The programmable physical coding sub-layer (PCS) module 34 includes a programmable transmit PCS module 42 and a programmable receive PCS module 44. The programmable transmit PCS module 42, which will be described in greater detail with reference to FIG. 4, receives transmit data words 46 from the programmable logic fabric 12 via the programmable interface 36 and converts them into the transmit parallel data 48 in accordance with the transmit PMA_PCS interface setting 60. The transmit PMA_PCS interface setting 60 indicates the rate of the transmit data words 46, the size of the transmit data words (e.g., 1-byte, 2-bytes, 3-bytes, 4-bytes, et cetera) and the corresponding transmission rate of the transmit parallel data 48. The programmable receive PCs module 44, which will be described in greater detail with reference to FIG. 3, converts the receive parallel data 54 into receive data words 56 in accordance with the receive PMA_PCS interface setting 62. The receive PMA_PCS interface setting 62 indicates the rate at which the receive parallel data 54 will be received, the width of the parallel data 54, the transmit rate of the receive data words 56 and the word size of the receive data words 56.

The control module 35 also generates the logic interface setting 58 that provides the rates at which the transmit data words 46 and receive data words 56 will be transceived with the programmable logic fabric 12. Note that the transmit data words 46 may be received from the programmable logic fabric 12 at a different rate than the received data words 56 are provided to the programmable logic fabric 12.

As one of average skill in the art will appreciate, each of the modules within the PMA module 32 and PCS module 34 may be individually programmed to support a desired data transfer rate. The data transfer rate may be in accordance with a particular standard such that the receive path, i.e., the programmable receive PMA module 40 and the programmable receive PCS module 44, may be programmed in accordance with one standard while the transmit path, i.e., the programmable transmit PCS module 42 and the programmable transmit PMA module 38, may be programmed in accordance with another standard.

Figure 3:
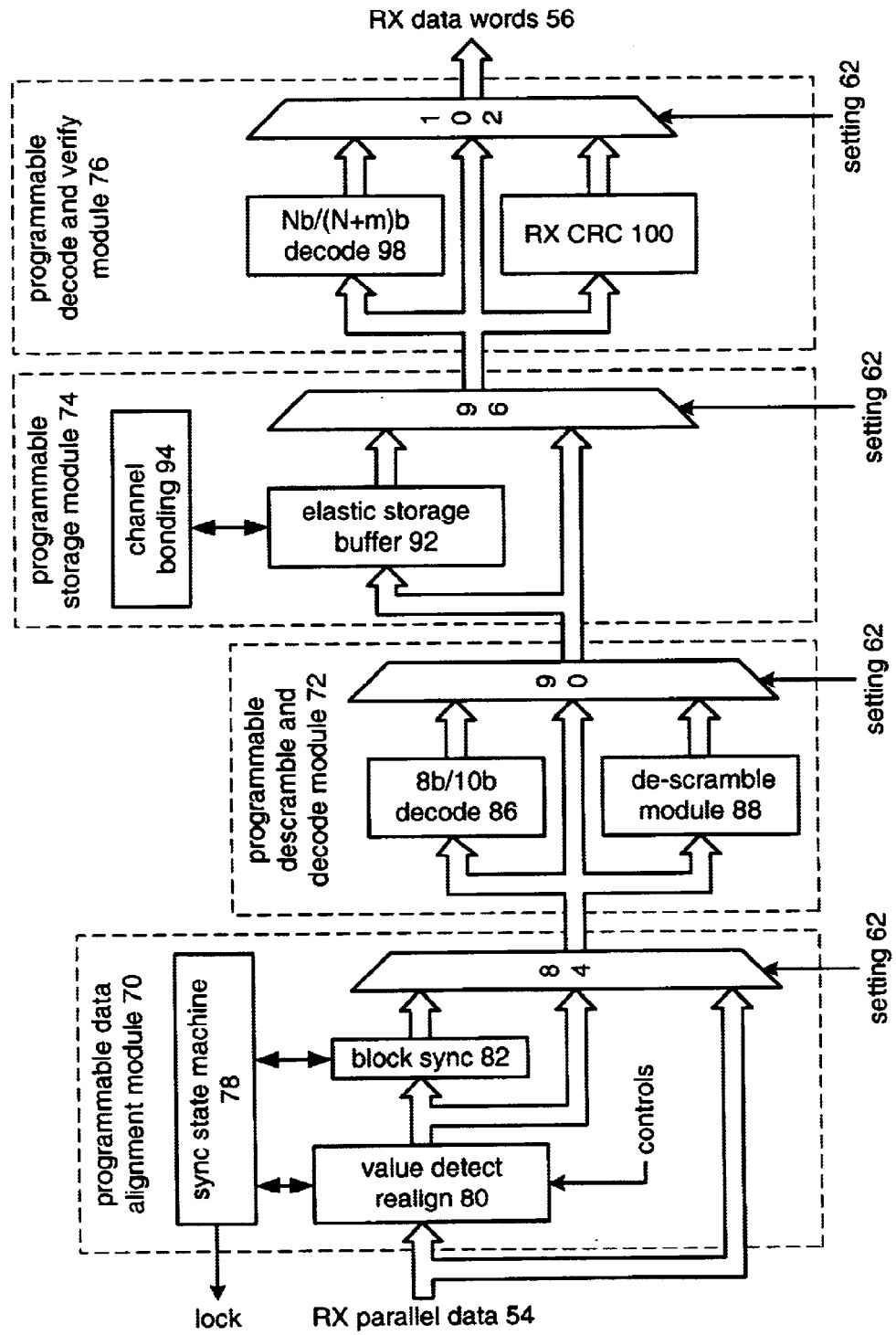
FIG. 3 is a schematic block diagram of a programmable receive physical coding sub-layer (PCS) module in accordance with the present invention.

FIG. 3 is a schematic block diagram of a programmable receive PCS module 44 that includes a programmable data alignment module 70, a programmable descramble and decode module 72, a programmable storage module 74, and a programmable decode and verify module 76. The programmable data alignment module 70 includes a synchronous state machine 78, a value detect realign module 80, a block synchronization module 82, and a multiplexer 84. The programmable descramble and decode module 72 includes a 64b/66b descrambling module 88, an 8b/10b decoding module 86 and a multiplexer 90. The programmable storage module 74 includes a channel bonding module 94, an elastic storage buffer 92 and a multiplexer 96. The programmable decode and verify module 76 includes a receiver CRC (cyclic redundancy check) module 100, a 64b/66b decoding module 98, and a multiplexer 102.

In operation, the programmable data alignment module 70 receives the receive parallel data 54. Based on the receive PMA_PCS interface setting 62, the receive parallel data 54 may be passed via multiplexer 84 without processing, may be processed by the value detect realign module 80 and then passed via multiplexer 84 and/or further processed via the block synchronization module 82. As such, the setting 62 may bypass the programmable data alignment module 70, perform a value detection realignment and pass the realigned data and/or further utilize block synchronization, which is typically used for 10 gigabits-per-second signaling. The synchronization state machine 78 coordinates the alignment of the receive parallel data 54 via the value detect realign 80 and the block synchronization module 82. In addition, once the value detect realign module 80 indicates that the data is valid and the block synchronization module 82 indicates that the PCS module is now in sync with the receive parallel data 54, the sync state machine 78 generates a lock signal.

The controls of the value detect realign module 80 include receive polarity of the signal, alignment information, et cetera.

The programmable descramble and decode module 72 receives the output of multiplexer 84 and, based on setting 62, either passes the data via multiplexer 90, descrambles it via the 64b/66b descrambler 88, or decodes it via the 8b/10b decode module 86. The 64b/66b descrambling module 88 is further described in co-pending patent application entitled "FRAMING OF TRANSMIT ENCODED DATA AND LINEAR FEEDBACK SHIFTING" by Joseph Neil Kryzak and Aaron J. Hoelscher, having a filing date the same as the present patent application. The 8b/10b decoding module 86 will be further described with reference to FIGS. 6, 8, 9-, 12, and 13.

The programmable storage module 74 may buffer the data it receives from multiplexer 90 via the elastic store buffer 92 to facilitate channel bonding or pass the data directly to multiplexer 96. The channel bonding module 94 enables the receiver of one programmable multi-gigabit transceiver to be linked or bonded with another receiver within another multi-gigabit transceiver to increase the effective serial data rate.

The programmable decode and verify module 76 receives the output of multiplexer 96 and passes it directly as the receive data word 56 in accordance with setting 62, processes the data via a receive CRC module 100 and provides that as the output, or decodes it via the 64b/66b decoding module 98. The 64b/66b decode module 98 is further described in co-pending patent application entitled "FRAMING OF TRANSMIT ENCODED DATA AND LINEAR FEEDBACK SHIFTING" by Joseph Neil Kryzak and Aaron J. Hoelscher, having a filing date the same as the present patent application.

As one of average skill in the art will appreciate, the programmable receive PCS module 44 is readily programmable via settings 62 to decode the receive parallel data 54 using a variety of decoding schemes, to process channel bonding, to verify and lock the incoming data, et cetera.

Figure 4:
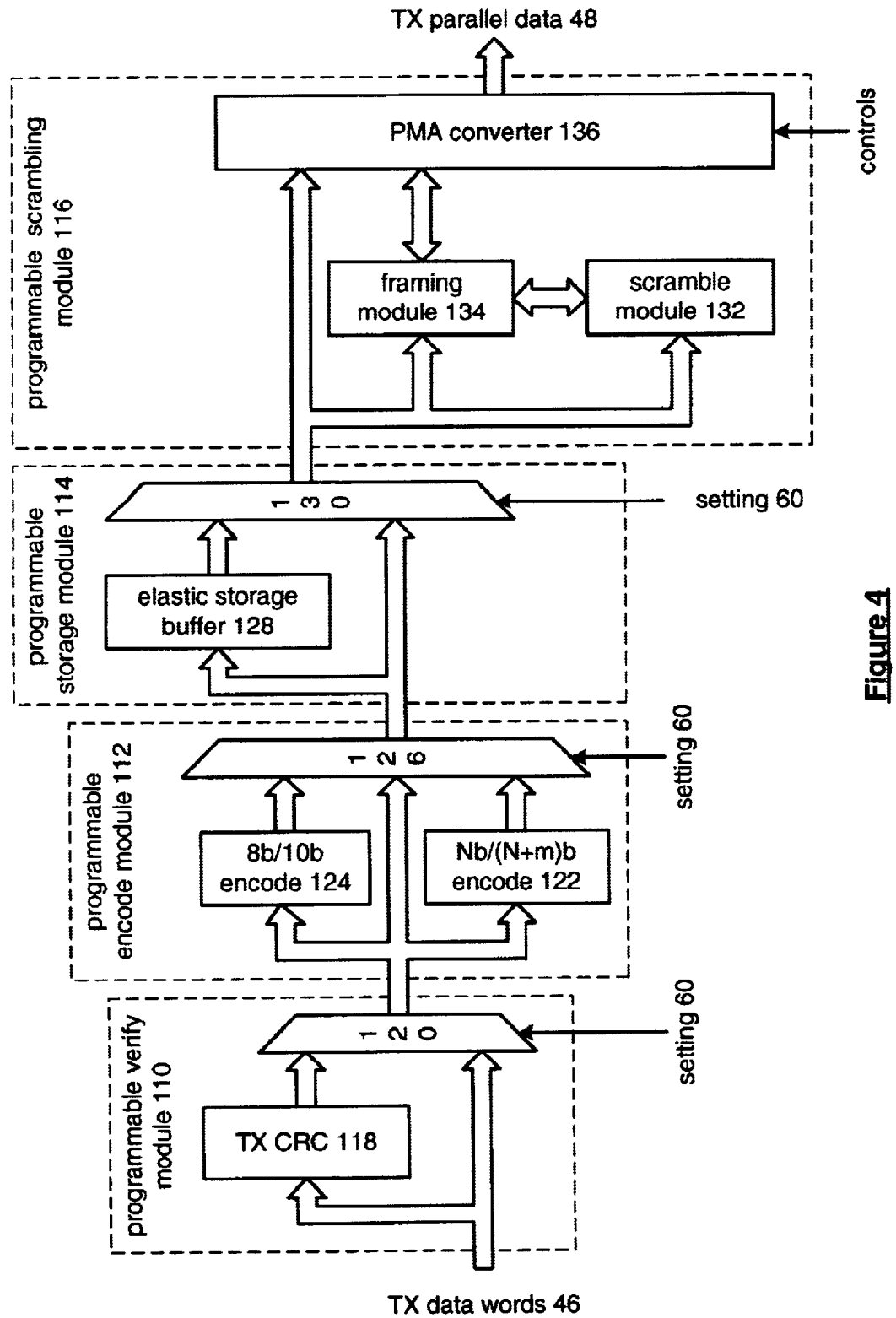
FIG. 4 is a schematic block diagram of a programmable transmit physical coding sub-layer (PCS) module in accordance with the present invention.

FIG. 4 is a schematic block diagram of the programmable transmit PCS module 42 that includes a programmable verify module 110, a programmable encode module 112, a programmable storage module 114, and a programmable scramble module 116. The programmable verify module 110 includes a transmit CRC module 118 and a multiplexer 120. The programmable encode module 112 includes a 64b/66b encoding module 122, an 8b/10b encoding module 124, and a multiplexer 126. The programmable storage module 114 includes an elastic storage buffer 128 and a multiplexer 130. The programmable scramble module 116 includes, a scramble module 132, a gearbox module 134, and a PMA converter 136.

The programmable verify module 110 is operably coupled to receive the transmit data words 46 and either pass them directly to the programmable encoding module 112 or perform a cyclic redundancy check upon them. The transmit PMA_PCS interface setting 60 indicates whether the transmit data words 46 will be directly passed to the programmable encode module 112 or be subject to a cyclic redundancy check. The programmable encoding module 112, based on setting 60, either encodes the data received from the programmable verify module 110 via the 8b/10b encoder 124, the 64b/66b encoder 122 or passes the data directly to the programmable storage module 114. The 64b/66b encoder 122 is further described in co-pending patent application entitled "FRAMING OF TRANSMIT ENCODED DATA AND LINEAR FEEDBACK SHIFTING" by Joseph Neil Kryzak and Aaron J. Hoelscher, having a filing date the same as the present patent application. The 8b/10b encoder 124 will be more fully described with reference to FIGS. 5, 7, 9, 10, and 11.

The programmable storage module 114, based on setting 60, either passes the data that it receives from the programmable encode module 112 or stores it in the elastic storage buffer 128. The elastic storage buffer 128 allows for differing time rates between the transmit data words 46 and the transmit parallel data 48. For example, if the transmit data words 46 are 1-byte words at a rate of 500 megahertz and the transmit parallel data 48 is 2-bytes width at 300 megahertz, the data-per-cycle rate is different between the transmit data words 46 and the transmit parallel data 48. Accordingly, the elastic storage buffer 128 allows for data to accumulate in the elastic storage buffer and thus accommodate the differing data-per-rate discrepancies between the transmit data word 46 and the transmit parallel data 48.

The programmable scramble module 116 receives the output of multiplexer 130 and either passes it directly to the PMA converter 136 to produce the transmit parallel data 48 based on control signals or scrambles the data via the scramble module 132 and the gearbox module 134. The controls for the PMA converter 136 include polarity of the parallel data 48 and an indication of which path the data will be received from.

As one of average skill in the art will appreciate, the programmable transmit PCS module 42 may be programmed in a variety of ways to directly pass the transmit data words 46, encode them, scramble them, buffer them, et cetera. As such, with a wide diversity in programming abilities, the programmable transmit PCS module 42 as well as the entire programmable multi-gigabit transceiver may be programmed in accordance with many standards.

Figure 5:
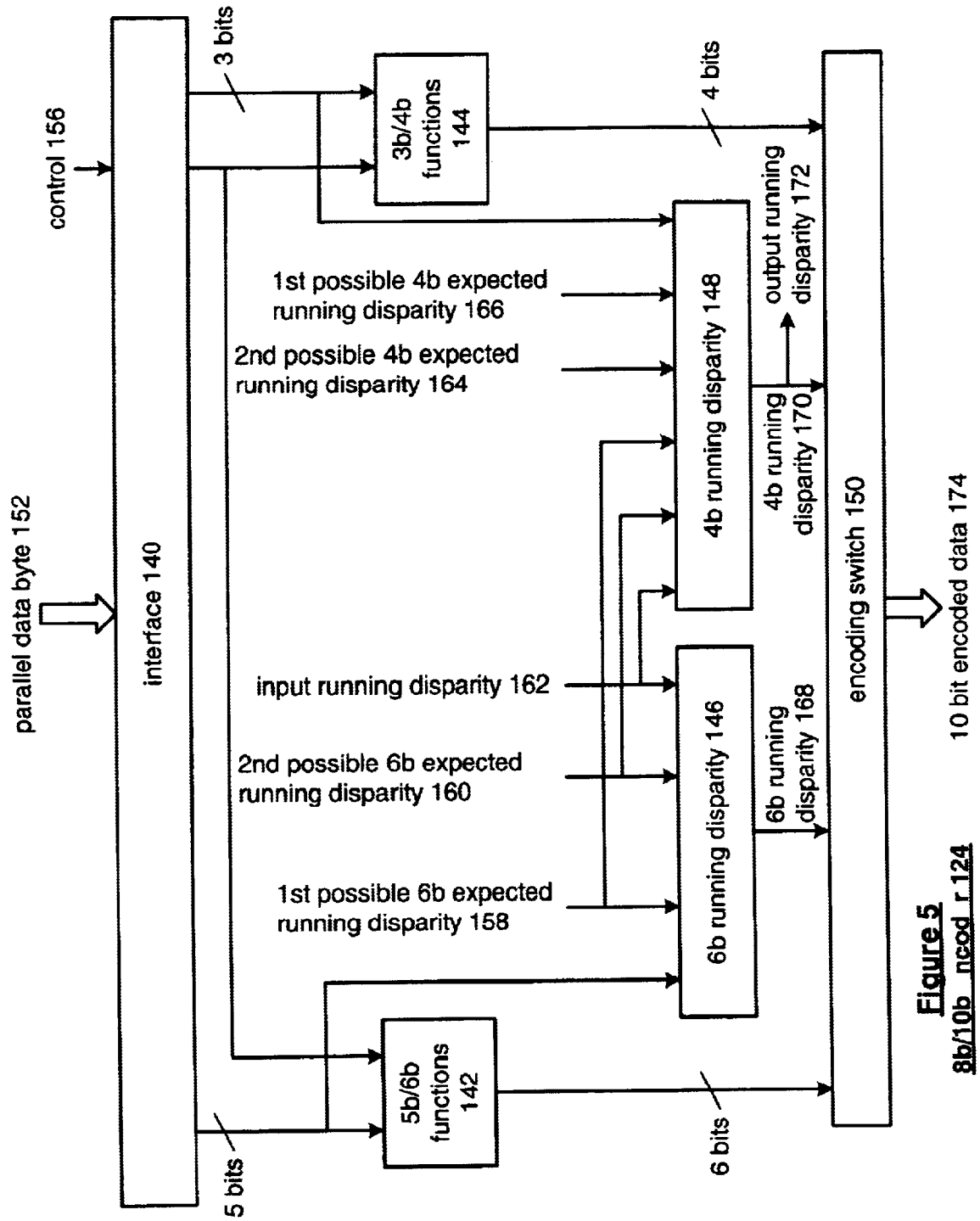
FIG. 5 is a schematic block diagram of an 8-bit/10-bit encoder in accordance with the present invention.

FIG. 5 is a schematic block diagram of an 8-bit/10-bit encoder 124 that receives parallel data bytes 152 via interface 140. The interface 140 splits a byte of parallel data into a 5-bit section and a 3-bit section. The 5-bit section is provided to a 5-bit/6-bit functional module 142 and the 3-bit section is provided to a 3-bit/4-bit functional module 144. The 5-bit/6-bit functional module 142 and 3-bit/4-bit functional module 144 function in accordance with the teachings of the 739 Patent. The 8-bit/10-bit encoder 124 further includes a 6-bit running disparity module 146 and a 4-bit running disparity module 148. The 6-bit running disparity module 146 receives, as inputs, the 5-bit portion of the parallel input byte, a $1^{st}$ possible 6-bit expected running disparity 158, a $2^{nd}$ possible 6-bit expected running disparity 160, and an input running disparity 162. Based on these inputs, the 6-bit running disparity 146 produces a 6-bit running disparity 168. The functionality of the 6-bit running disparity 146 will be described in greater detail with reference to FIGS. 9–11.

The 4-bit running disparity module 148 receives, as inputs, the $1^{st}$ possible 6-bit expected running disparity 158, the $2^{nd}$ possible 6-bit expected running disparity 160, the input running disparity 162, a $2^{nd}$ possible 4-bit expected running disparity 164, a $1^{st}$ possible 4-bit expected running disparity 166, and the 3-bits of the parallel data byte 152. From these inputs, the 4-bit running disparity 148 produces a 4-bit disparity 170, which corresponds to the output running disparity 172 for this particular encoder 124. Note that the interface 140 receives control 156 that controls the providing of the 5 bits and 3 bits to the modules 142 and 144 and further facilitates the encoding process in accordance with the teachings of the 739 Patent.

The encoding switch 150 of encoder 124 is operably coupled to receive the encoded 6-bits (from 5-bit/6-bit functional module 142), the encoded 4-bits (from 3-bit/4-bit functional module 144), the 6-bit running disparity 168 (from 6-bit running disparity module 146), and the 4-bit running disparity 170 (from 4-bit running disparity module 148) to produce a 10-bit encoded data word 174.

Figure 6:
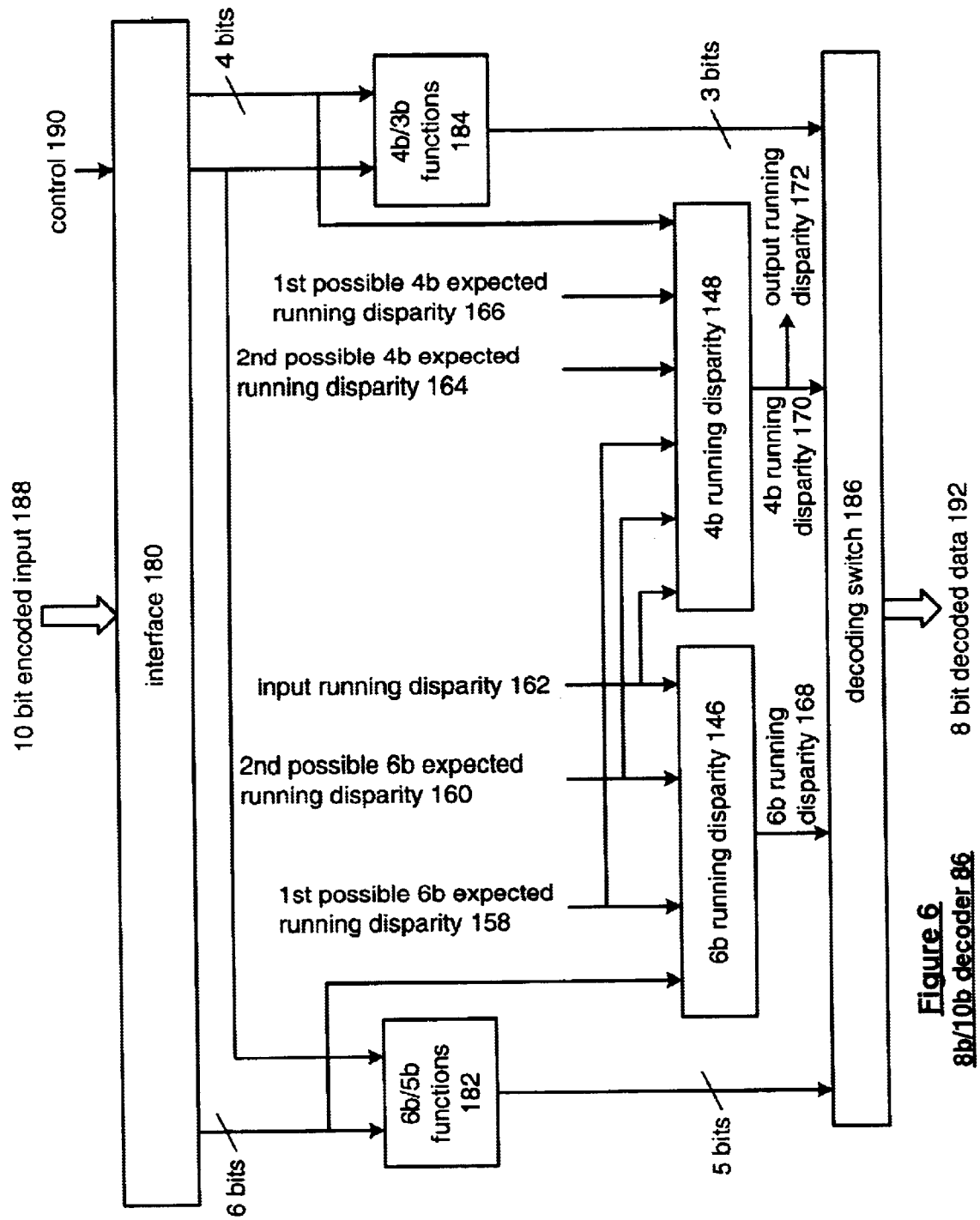
FIG. 6 is a schematic block diagram of a 8-bit/10-bit decoder in accordance with the present invention.

FIG. 6 is a schematic block diagram of an 8-bit/10-bit decoder 86 that includes interface 180, 6-bit/5-bit functional module 182, 4-bit/3-bit functional module 184, the 6-bit running disparity module 146, the 4-bit running disparity module 148, and an decoding switch 186. The functionality of the 6-bit running disparity 146 and the 4-bit running disparity 148 are as previously discussed with reference to FIG. 5 and as will be further described with reference to FIGS. 9–13.

The 6-bit/5-bit functional module 182 receives 6-bits of the 10-bit encoded input 188 via the interface 180 under the control of control signals 190 and produces there from a 5-bit digital value. The 4-bit/3-bit function module 184 receives 4-bits of the 10-bit encoded input 188 via interface 180 under the control of control signals 190 to produce 3-bits of digital information.

The decoding switch 186 receives the 5-bits of decoded information (from 6-bit/5-bit functional module 182), the 3-bits of decoded information (from 4-bit/3-bit functional module 184), the 6-bit running disparity 168 (from 6-bit running disparity module 146) and the 4-bit running disparity 170 (from 4-bit running disparity module 148) to produce an 8-bit decoded data value 192.

Figure 7:
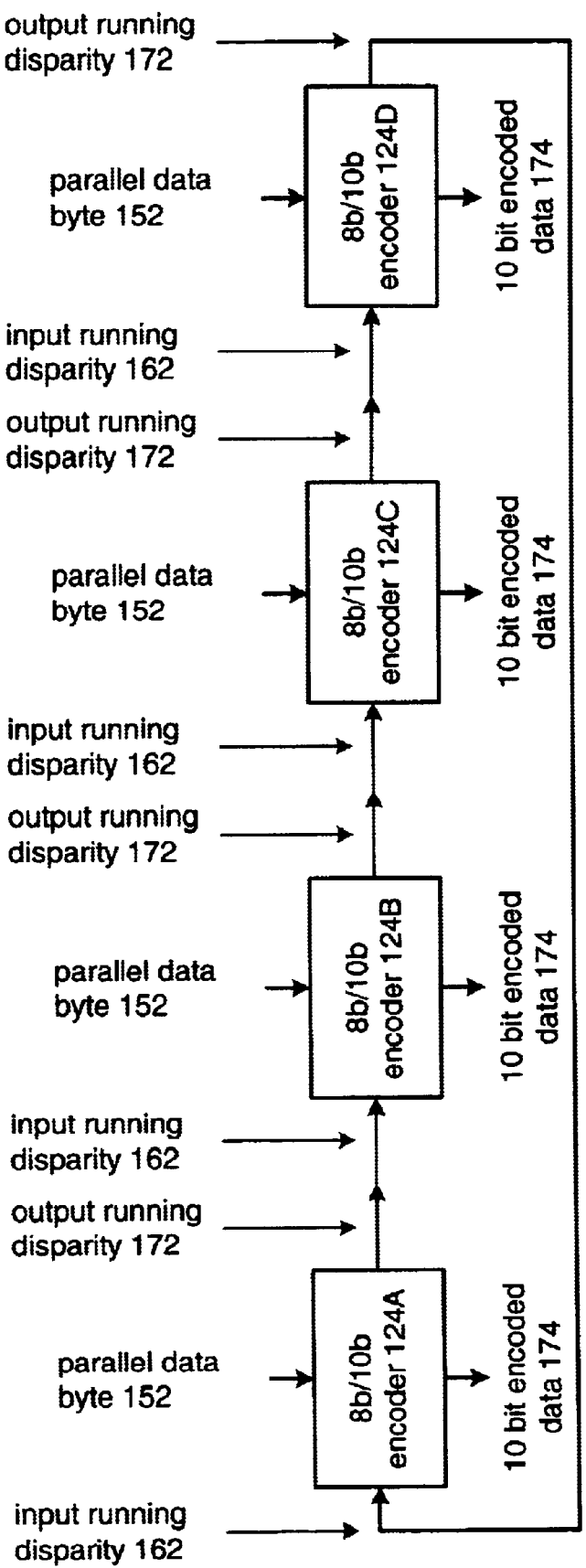
FIG. 7 is a schematic block diagram of a 32-bit/40-bit encoding process in accordance with the present invention.

FIG. 7 is a schematic block diagram of 32-bit/40-bit encoding in accordance with the present invention. As shown, to achieve 32-bit/40-bit encoding four 8-bit/10-bit encoders 124A, 124B, 124C, and 124D function in parallel on the input data and are coupled in a daisy-chain manner for the running disparity. In this instance, each of the encoders 124A, B, C and D may be in different multi-gigabit transceivers as shown in FIG. 1 or within the same multi-gigabit transceiver. As shown, each encoder 124A, B, C and D receive parallel data bytes 152, each of which corresponds to 8-bits of a 32-bit input, and output a 10-bit encoded data value 174, each of which corresponds to 10 bits of a 40-bit encoded output.

In addition, each encoder 124A, B, C and D receives an input running disparity 162 as the output running disparity 172 from the preceding encoder in the daisy-chain. For example, the input running disparity 162 for encoder 124A is the output running disparity 172 of encoder 124D. By utilizing the running disparity calculations via the modules 146 and 148 as shown in FIGS. 5 and 6, the time to calculate the running disparity is substantially reduced. For example, if the multi-gigabit transceiver is implemented in 0.18 micron CMOS technology, the time to calculate a running disparity is approximately one-half of a nanosecond. As such, each 8-bit/10-bit encoder may receive parallel input data at up to a 2 gigahertz rate if the limiting factor were the running disparity.

Figure 8:
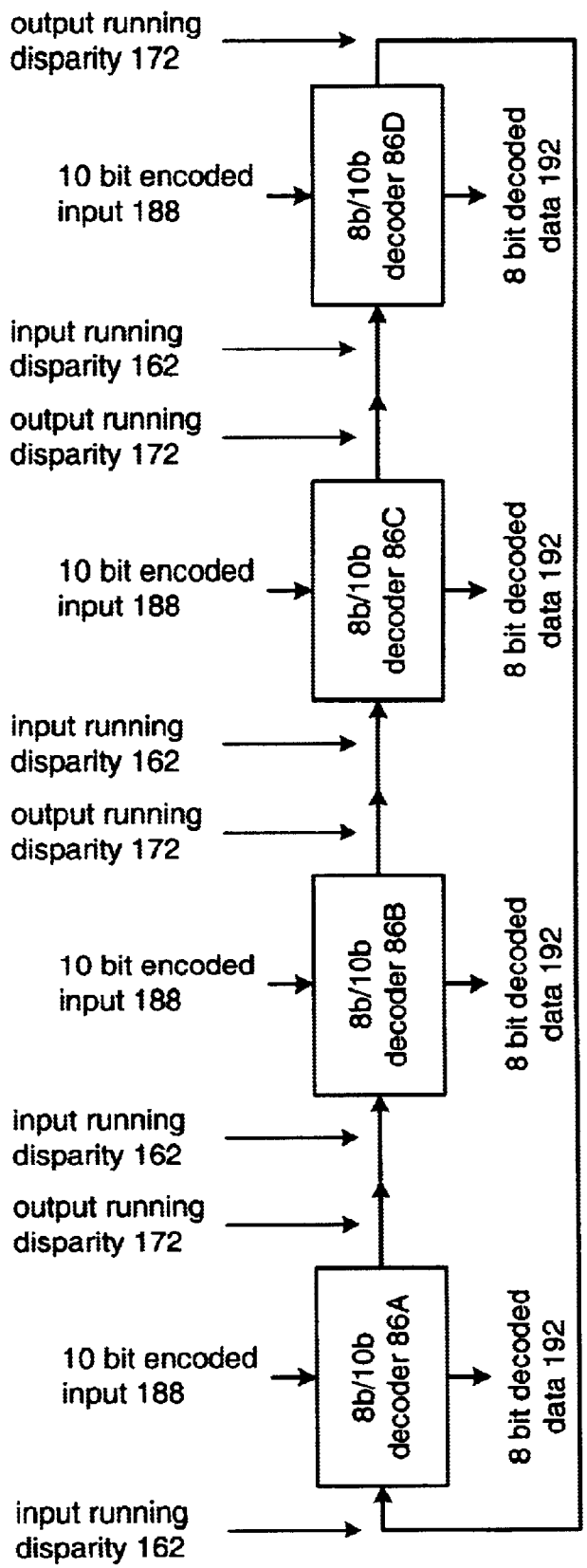
FIG. 8 is a schematic block diagram of a 32-bit/40-bit decoding process in accordance with the present invention.

FIG. 8 is a schematic block diagram of 32-bit/40-bit decoding in accordance with the present invention. In this embodiment, four 8-bit/10-bit decoders 86A, B, C and D operate in parallel with respect to a 40-bit encoded input and are coupled in a daisy chain fashion with respect to the running disparity. Each decoder 86A, B, C and D receives a 10-bit encoded input 188, which is a portion of the 40-bit encoded input and produces therefrom an 8-bit decoded data value 192. As shown, the input running disparity 162 for one decoder corresponds to the output running disparity 172 of the preceding decoder in the daisy chain. For example, the input running disparity 162 for decoder 86C is the output running disparity 172 of decoder 86B. Note that each of the decoders 86A, B, C and D may be in the same multi-gigabit transceiver or different multi-gigabit transceivers.

Figure 9:
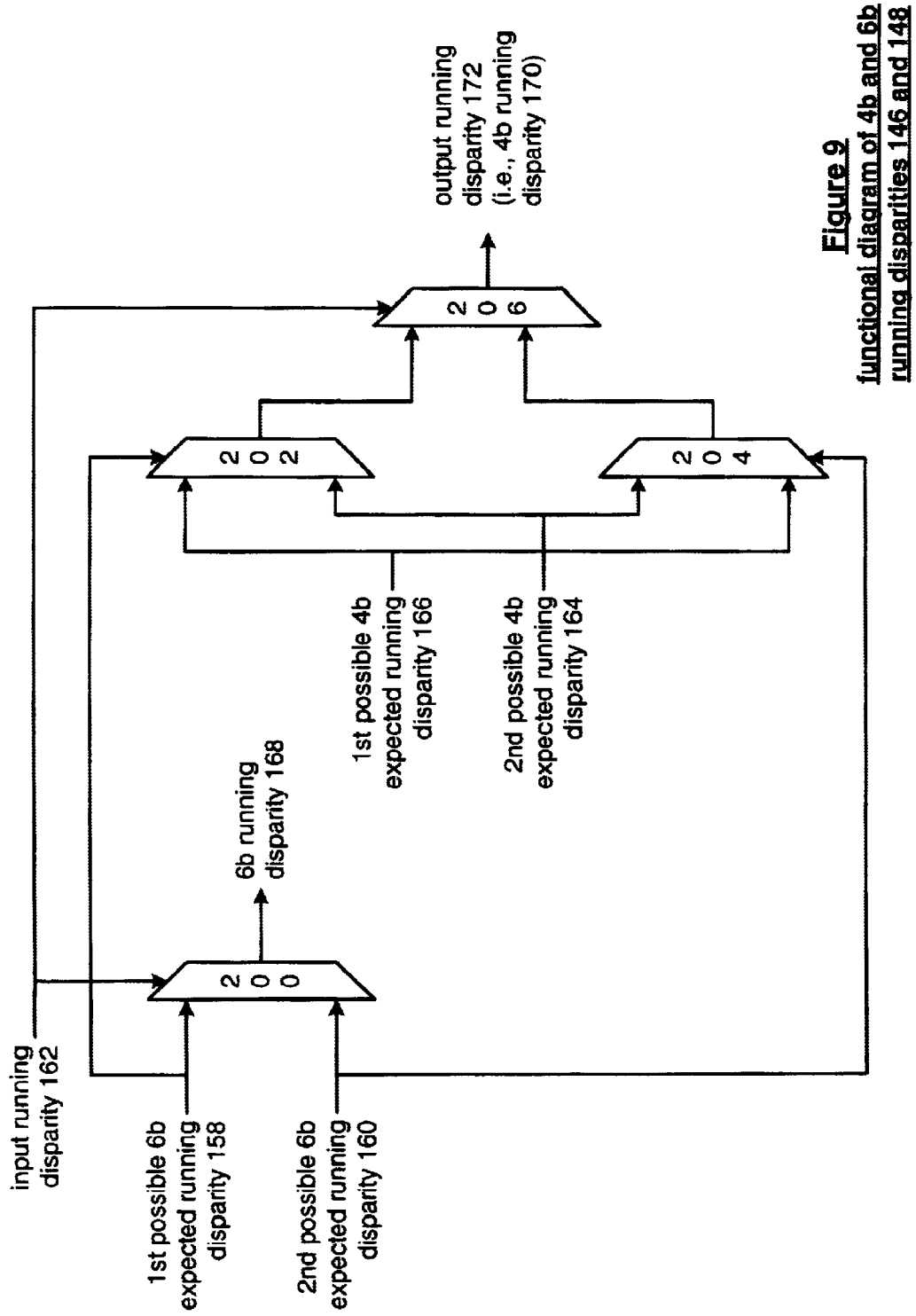
FIG. 9 is a functional diagram of generating the 4-bit and 6-bit running disparities in accordance with the present invention.

FIG. 9 illustrates a functional diagram for generating, in parallel, the 4-bit running disparity and the 6-bit running disparity. As shown, the determination of the 4-bit running disparity 170 and the 6-bit running disparity 168 may be done via a selection process using multiplexers 200–206.

The 6-bit running disparity 168 corresponds to either the $1^{st}$ possible 6-bit expected running disparity 158 or the $2^{nd}$ possible 6-bit expected running disparity 160 based on the value of the input running disparity 162. For example, the $1^{st}$ possible 6-bit expected running disparity 158 may be positive and the $2^{nd}$ possible 6-bit expected running disparity may be negative. Thus, if the input running disparity is positive, the $1^{st}$ possible 6-bit expected running disparity 158 is selected and if the input running disparity 162 is negative the $2^{nd}$ possible 6-bit expected running disparity 160 is selected.

The 4-bit running disparity 170, which corresponds to the output running disparity 172, is produced via multiplexers 202–206. As shown, multiplexers 202 and 204 each receive a $1^{st}$ possible 4-bit expected running disparity 166 and the $2^{nd}$ possible 4-bit expected running disparity 164. For example, the $1^{st}$ possible 4-bit expected running disparity 166 may be positive and the $2^{nd}$ possible 4-bit expected running disparity 164 may be negative. The selection for the output of the multiplexer 202 is based on the value of the $1^{st}$ possible 6-bit expected running disparity 158, and the selection for multiplexer 204 is based on the $2^{nd}$ possible 6-bit expected running disparity 160. Note that the expected 4-bit running disparity and 6-bit running disparity correspond to the expected running disparities provided in Tables I and II of the 739 Patent. Thus, for example, the value listed in the expected running value column (column D-1 of Table I of the 739 Patent) may be the $1^{st}$ possible 6-bit expected running disparity 158 and the $2^{nd}$ possible 6-bit expected running disparity 160 corresponds to the opposite of the value listed in Column D-1. Similarly the $1^{st}$ possible 4-bit expected running disparity 166 may corresponds to the value indicated in the D-1 Column of Table II and the $2^{nd}$ possible 4-bit expected running disparity 164 corresponds to the opposite value.

The multiplexer 206 receives the outputs from multiplexers 204 and 206 and selects one of them based on the current value of the input running disparity 162 to produce the output running disparity 172.

Figure 10:
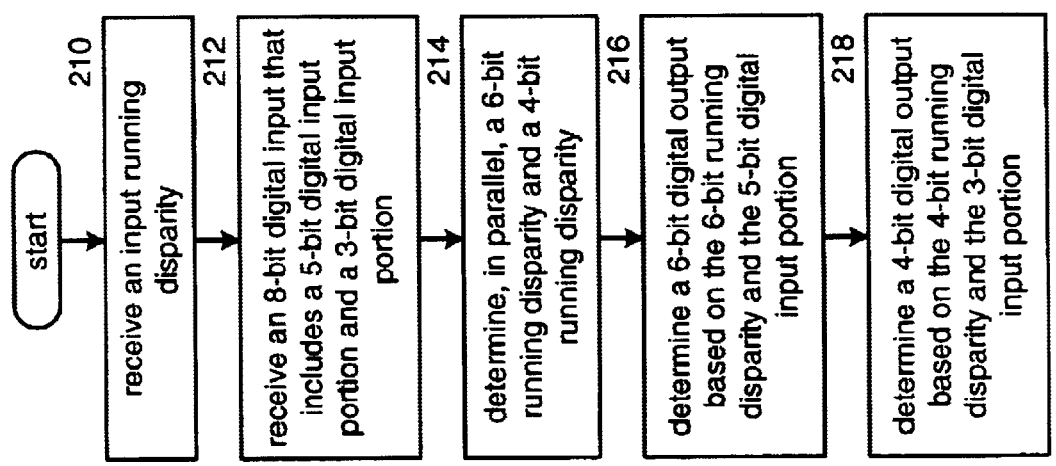
FIG. 10 is a logic diagram of a method for 8-bit/10-bit encoding in accordance with the present invention.

FIG. 10 is a logic diagram of a method for 8-bit/10-bit encoding that begins at Step 210 where an input running disparity is received. The process then proceeds to Step 212 where an 8-bit digital input is received, wherein the 8-bit digital input includes a 5-bit digital input portion and a 3-bit digital input portion. The process then proceeds to Step 214 where a 6-bit running disparity and a 4-bit running disparity are determined in parallel. The 6-bit running disparity is based on a $1^{st}$ possible 6-bit expected running disparity value, a $2^{nd}$ possible 6-bit expected running disparity value, the input running disparity, and the 5-bit digital input portion. The 4-bit running disparity is based on the $1^{st}$ possible 6-bit expected running disparity value, the $2^{nd}$ possible 6-bit expected running disparity value, a $1^{st}$ possible 4-bit expected running disparity value, a $2^{nd}$ possible 4-bit expected running disparity value, the input running disparity value, and the 3-bit digital input portion.

The determination of the 6-bit running disparity may be done by selecting the $1^{st}$ possible 6-bit expected running disparity as the 6-bit running disparity when the input running disparity is in a $1^{st}$ state and the 5-bit digital input portion is within a $1^{st}$ set of digital values. The 6-bit running disparity may also be determined by selecting the $2^{nd}$ possible 6-bit expected running disparity as the 6-bit running disparity when the input running disparity is in a $2^{nd}$ state and the 5-bit digital input portion is within the $1^{st}$ set of digital values. The 6-bit running disparity may also be determined by setting the 6-bit running disparity to substantially equal the input running disparity when the 5-bit digital input portion is within a $2^{nd}$ set of values (i.e., the 5-bit input values that have a don't-care for the expected running disparity).

The 4-bit running disparity may be determined by selecting the $1^{st}$ possible 4-bit expected running disparity as a $1^{st}$ intermediate 4-bit expected running disparity when the $1^{st}$ possible 6-bit expected running disparity is in a $1^{st}$ state. The $2^{nd}$ possible 4-bit expected running disparity may be selected as the $1^{st}$ intermediate 4-bit expected running disparity when the $1^{st}$ possible 6-bit expected running disparity is in a $2^{nd}$ state. This may correspond to the functionality of multiplexer 202 as shown in FIG. 9. The $1^{st}$ possible 4-bit expected running disparity may be selected as a $2^{nd}$ intermediate 4-bit expected running disparity when the $2^{nd}$ possible 6-bit expected running disparity is in a $1^{st}$ state. The $2^{nd}$ possible 4-bit expected running disparity may be selected as the $2^{nd}$ intermediate 4-bit expected running disparity where the $2^{nd}$ possible 4-bit expected running disparity is in a $2^{nd}$ state. This corresponds to the functionality of multiplexer 204 of FIG. 9. The $1^{st}$ intermediate 4-bit expected running disparity may be selected as the 4-bit running disparity when the input running disparity is in a $1^{st}$ state. The $2_{nd}$ intermediate 4-bit expected running disparity may be selected as the 4-bit running disparity when the input running disparity is in a $2^{nd}$ state. This corresponds to the functionality of multiplexer 206 of FIG. 9.

The process then proceeds to Step 216 where a 6-bit digital output is determined based on the 6-bit running disparity and the 5-bit digital input. This may be done by establishing the 6-bit digital output from the digital input portion when the 5-bit digital input portion is of a value within a $1^{st}$ set of values. The 6-bit digital output may also be determined by equating a $1^{st}$ 6-bit digital value as the 6-bit digital output when the 6-bit running disparity is in a $1^{st}$ state and the 5-bit digital input portion is of a value within a $2^{nd}$ set of values. The 6-bit digital output may also be determined by equating a $2^{nd}$ 6-bit digital value as the 6-bit digital output when the 6-bit running disparity is in a $2^{nd}$ state and the 5-bit digital input is of a value in the $2^{nd}$ set of values. Accordingly, with reference to Table I of the 739 Patent, the values of the 5-bit input within the $1^{st}$ set of values correspond to the values having a don't-care for the expected 6-bit running disparity, which is indicated Column D-1. For digital values in the $2^{nd}$ set of values for the 5-bit input, which corresponds to the digital inputs that do have a + or – indicated for the expected 6-bit running disparity in Column D-1, the $1^{st}$ 6-bit digital value corresponds to the value in the Column labeled a–i and the $2^{nd}$ 6-bit digital value corresponds to the values in the alternate a–i Column.

The process then proceeds to Step 218 where a 4-bit digital output is determined based on the 4-bit running disparity and the 3-bit digital input portion. The resulting 6-bit digital output and the 4-bit digital output provide a 10-bit encoded digital output. The determination of the 4-bit digital output may be done by establishing the 4-bit digital output from the 3-bit digital input portion when the 3-bit digital input portion is of a value within a $1^{st}$ set of values.

The 4-bit digital output may also be determined by equating a $1^{st}$ 4-bit digital value as the 4-bit digital output when the 4-bit running disparity is in a $1^{st}$ state and a 3-bit digital input portion is of a value within a $2^{nd}$ set of values. Further, the 4-bit digital output may be determined by equating a $2^{nd}$ 4-bit digital value as the 4-bit digital output when the 4-bit running disparity is in a $2^{nd}$ state and the 3-bit digital input portion is of a value in the $2^{nd}$ set of values. With reference to Table II of the 739 Patent, the 3-bit digital input portion that are within the $1^{st}$ set are those values having an expected running disparity, as shown in Column D-1, of don't-care. The 3-bit digital input portions having a + or − in the expected running disparity Column D-1 are those values within the $2^{nd}$ set of values. The $1^{st}$ 4-bit digital value may correspond to the digital value in the f, g, h, j Column and the $2^{nd}$ 4-bit digital value may correspond to the alternate f, g, h, j Column.

Figure 11:
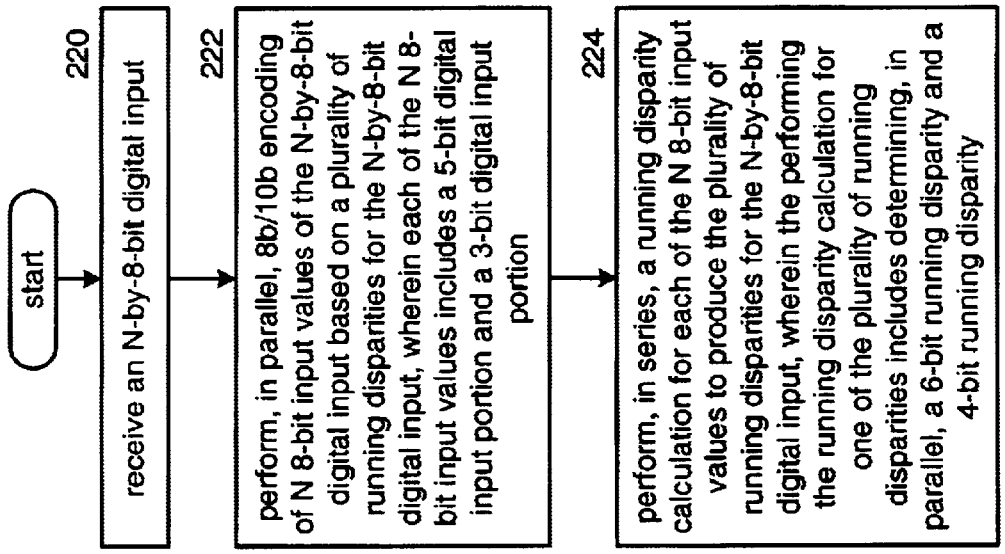
FIG. 11 is a logic diagram of a method for parallel 8-bit/10-bit encoding in accordance with the present invention.

FIG. 11 is a logic diagram of a method for parallel 8b/10b encoding that begins at Step 220 by receiving an N by 8-bit digital input. The N corresponds to an integer number that indicates the number of 8-bit digital inputs that are being processed in parallel. For example, for a 32-bit digital input N is 4.

The process then proceeds to Step 222 where 8-bit/10-bit encoding of N 8-bit input values of the N by 8-bit digital input is performed in parallel based on a plurality of running disparities. Each of the N 8-bit digital input values includes a 5-bit digital input portion and a 3-bit digital input portion.

The process then proceeds to Step 224 where a running disparity calculation is performed in series for each of the N 8-bit digital input values to produce the plurality of running disparities. The performance of the running disparity calculation for one of the N bit digital input values includes determining, in parallel a 4-bit running disparity and a 6-bit running disparity, which was described with reference to FIG. 10.

Figure 12:
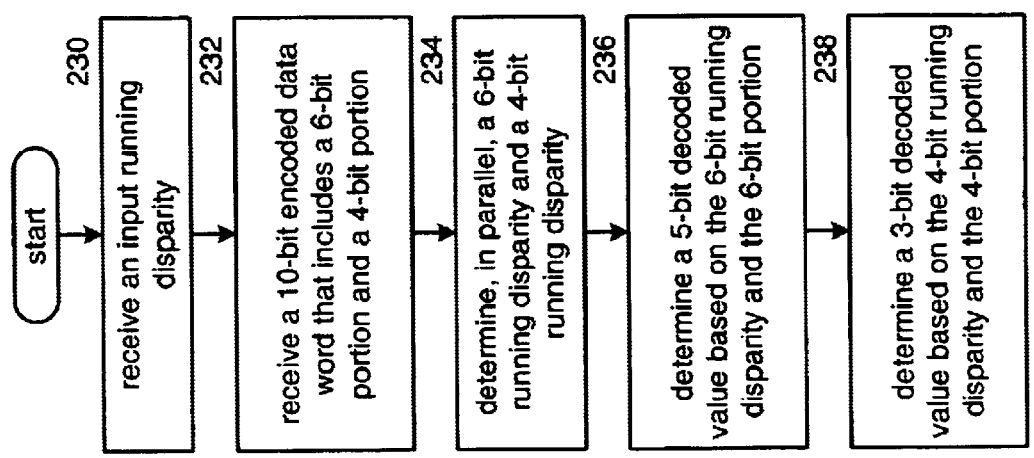
FIG. 12 is a logic diagram of a method for 8-bit/10-bit decoding in accordance with the present invention.

FIG. 12 is a logic diagram of a method for 8b/10b decoding that begins at Step 230 by receiving an input running disparity. The process then proceeds to Step 232 where a 10-bit encoded data word is received that includes a 6-bit portion and a 4-bit portion. The process then proceeds to Step 234 where a 6-bit running disparity and a 4-bit running disparity are determined in parallel. This is a similar process as to Step 214 of FIG. 10.

The process then proceeds to Step 236 where a 5-bit decoded value is determined based on the 6-bit running disparity and the 6-bit portion. The process then proceeds to Step 238 where a 3-bit decoded value is determined based on the 4-bit running disparity and the 4-bit portion. With reference to Tables IV and V of the 739 Patent, one can readily determine how the 5-bit decoded value and 3-bit decoded value are obtained.

Figure 13:
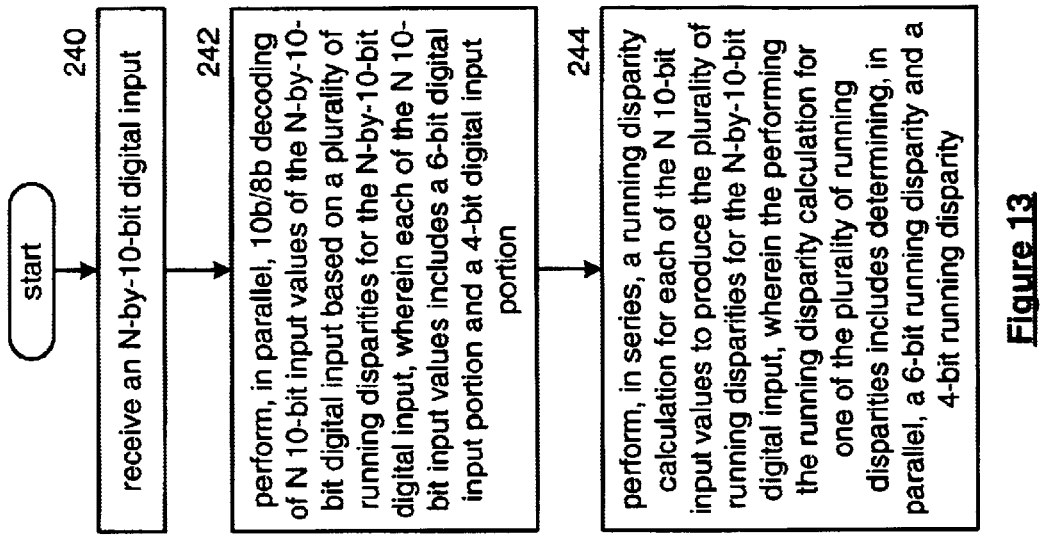
FIG. 13 is a logic diagram of a method for parallel 8-bit/10-bit decoding in accordance with the present invention.

FIG. 13 is a logic diagram of a method for parallel 8-bit/10-bit decoding that begins at Step 240 where an N by 10-bit digital input is received. The N is an integer number that corresponds to the number of parallel 8-bit/10-bit decoding processes that are being performed. For example, if a 40-bit digital input is received, N=4 such that the 40-bit digital input value includes four 10-bit digital inputs.

The process then proceeds to Step 242 where 10-bit/8-bit decoding of the N 10-bit input values is performed in parallel based on a plurality of running disparities for the N by 10-bit digital input. Each of the N 10-bit digital input values includes a 6-bit digital input portion and a 4-bit digital input portion.

The process then proceeds to Step 244 where a running disparity calculation is performed in series for each of the N 10-bit input values to produce the plurality of running disparities. The performance of the running disparity calculation for one of the plurality of running disparities includes determining, in parallel, a 6-bit running disparity and a 4-bit running disparity.

The preceding discussion has presented a method and apparatus for 8-bit/10-bit encoding/decoding and parallel 8-bit/10-bit encoding/decoding. By efficiently calculating the running disparity, the time to calculate the running disparity is substantially reduced. By reducing the time to calculate the running disparity, the data rates for 8-bit/10-bit decoding may be increased. As one of average skill in the art will appreciate, other embodiments may be derived from the teaching of the present invention without deviating from the scope of the claims.

What is claimed is:

1. A method for 8b/10b encoding, the method comprising:

receiving an input running disparity;

receiving an 8-bit input that includes a 5-bit input portion and a 3-bit input portion;

determining, in parallel, a 6-bit running disparity and a 4-bit running disparity, wherein the 6-bit running disparity is based on a first possible 6-bit expected running disparity, a second possible 6-bit expected running disparity, the input running disparity, and the 5-bit input portion, and wherein the 4-bit running disparity is based on the first possible 6-bit expected running disparity, the second possible 6-bit expected running disparity, a first possible 4-bit expected running disparity, a second possible 4-bit expected running disparity, the input running disparity, and the 3-bit input portion;

determining a 6-bit output based on the 6-bit running disparity and the 5-bit input portion; and determining a 4-bit output based on the 4-bit running disparity and the 3-bit input portion, wherein the 6-bit output and the 4-bit output provide a 10-bit encoded output.

2. The method of claim 1, wherein the determining the 6-bit running disparity further comprises:

selecting the first possible 6-bit expected running disparity as the 6-bit running disparity when the input running disparity is in a first state and the 5-bit input portion is within a first set of values;

selecting the second possible 6-bit expected running disparity as the 6-bit running disparity when the input running disparity is in a second state and the 5-bit input portion is within the first set of values; and setting the 6-bit running disparity to substantially equal the input running disparity when the 5-bit input portion is within a second set of values.

3. The method of claim 1, wherein the determining the 4-bit running disparity further comprises:

selecting the first possible 4-bit expected running disparity as a first intermediate 4-bit expected running disparity when the first possible 6-bit expected running disparity is in a first state;

selecting the second possible 4-bit expected running disparity as the first intermediate 4-bit expected running disparity when the first possible 6-bit expected running disparity is in a second state;

selecting the first possible 4-bit expected running disparity as a second intermediate 4-bit expected running disparity when the second possible 6-bit expected running disparity is in a third state;

selecting the second possible 4-bit expected running disparity as the second intermediate 4-bit expected running disparity when the second possible 6-bit expected running disparity is in a fourth state;

selecting the first intermediate 4-bit expected running disparity as the 4-bit running disparity when the input running disparity is in a fifth state; and selecting the second intermediate 4-bit expected running disparity as the 4-bit running disparity when the input running disparity is in a sixth state.

4. The method of claim 1, wherein the determining the 6-bit output further comprises:

establishing the 6-bit output from the 5-bit input portion when the 5-bit input portion is off a value within a first set of values;

equating a first 6-bit value as the 6-bit output when the 6-bit running disparity is in a first state and the 5-bit input portion is of a value within a second set of values; and equating a second 6-bit value as the 6-bit output when the 6-bit running disparity is in a second state and the 5-bit input portion is of a value within the second set of values.

5. The method of claim 1, wherein the determining the 4-bit output further comprises:

establishing the 4-bit output from the 3-bit input portion when the 3-bit input portion is of a value within a first set of values;

equating a first 4-bit value as the 4-bit output when the 4-bit running disparity is in a first state and the 3-bit input portion is of a value within a second set of values; and equating a second 4-bit value as the 4-bit output when the 4-bit running disparity is in a second state and the 3-bit input portion is of a value within the second set of values.

6. A method for parallel 8b/10b encoding, the method comprising:

receiving an N-by-8-bit input;

performing, in parallel, 8b/10b encoding of N 8-bit input values of the N-by-8-bit input based on a plurality of running disparities for the N-by-8-bit input, wherein each of the N 8-bit input values includes a 5-bit input portion and a 3-bit input portion;

performing, in series, a running disparity calculation for each of the N 8-bit input values to produce the plurality of running disparities for the N-by-8-bit input, wherein the performing the running disparity calculation for one of the plurality of running disparities includes:

determining, in parallel, a 6-bit running disparity and a 4-bit running disparity, wherein the 6-bit running disparity is based on a first possible 6-bit expected running disparity, a second possible 6-bit expected running disparity, an input running disparity, and the 5-bit input portion, and wherein the 4-bit running disparity is based on the first possible 6-bit expected running disparity, the second possible 6-bit expected running, disparity, a first possible 4-bit expected running disparity, a second possible 4-bit expected running disparity, the input running disparity, and the 3-bit input portion.

7. The method of claim 6, wherein the performing the 8b/10b encoding further comprises, for each of the N 8-bit input values:

determining a 6-bit output based on the 6-bit running disparity and the 5-bit input portion; and determining a 4-bit output based on the 4-bit running disparity and the 3-bit input portion, wherein the 6-bit output and the 4-bit output provide a 10-bit encoded output.

8. The method of claim 7, wherein the determining the 6-bit output further comprises:

establishing the 6-bit output from the 5-bit input portion when the 5-bit input portion is of a value within a first set of values;

equating a first 6-bit value as the 6-bit output when the 6-bit running disparity is in a first state and the 5-bit input portion is of a value within a second set of values; and equating a second 6-bit value as the 6-bit output when the 6-bit running disparity is in a second state and the 5-bit input portion is of a value within the second set of values.

9. The method of claim 7, wherein the determining the 4-bit output further comprises:

establishing the 4-bit output from the 3-bit input portion when the 3-bit input portion is of a value within a first set of values;

equating a first 4-bit value as the 4-bit output when the 4-bit running disparity is in a first state and the 3-bit input portion is of a value within a second set of values; and equating a second 4-bit value as the 4-bit output when the 4-bit running disparity is in a second state and the 3-bit input portion is of a value within the second set of values.

10. The method of claim 6, wherein the determining the 6-bit running disparity further comprises:

selecting the first possible 6-bit expected running disparity as the 6-bit running disparity when the input running disparity is in a first state and the 5-bit input portion is within a first set of values;

selecting the second possible 6-bit expected running disparity as the 6-bit running disparity when the input running disparity is in a second state and the 5-bit input portion is within the first set of values; and setting the 6-bit running disparity to substantially equal the input running disparity when the 5-bit input portion is within a second set of values.

11. The method of claim 6, wherein the determining the 4-bit running disparity further comprises:

selecting the first possible 4-bit expected running disparity as a first intermediate 4-bit expected running disparity when the first possible 6-bit expected running disparity is in a first state;

selecting the second possible 4-bit expected running disparity as the first intermediate 4-bit expected running disparity when the first possible 6-bit expected running disparity is in a second state;

selecting the first possible 4-bit expected running disparity as a second intermediate 4-bit expected running disparity when the second possible 6-bit expected running disparity is in a third state;

selecting the second possible 4-bit expected running disparity as the second intermediate 4-bit expected running disparity when the second possible 6-bit expected running disparity is in a fourth state;

selecting the first intermediate 4-bit expected running disparity as the 4-bit running disparity when the input running disparity is in a fifth state; and selecting the second intermediate 4-bit expected running disparity as the 4-bit running disparity when the input running disparity is in a sixth state.

12. A multi-gigabit transceiver comprising:
a transmitting section that includes a transmitter physical media attachment module and a transmitter physical coding sub-layer module, wherein the transmitter physical coding sub-layer module includes an 8b/10b encoding module that is operably coupled to:
receive an input running disparity;
receive an 8-bit input that includes a 5-bit input portion and a 3-bit input portion;
determine, in parallel, a 6-bit running disparity and a 4-bit running disparity, wherein the 6-bit running disparity is based on a first possible 6-bit expected running disparity, a second possible 6-bit expected running disparity, the input running disparity, and the 5-bit input portion, and wherein the 4-bit running disparity is based on the first possible 6-bit expected running disparity, the second possible 6-bit expected running disparity, a first possible 4-bit expected running disparity, a second possible 4-bit expected running disparity, the input running disparity, and the 3-bit input portion;
determine a 6-bit output based on the 6-bit running disparity and the 5-bit input portion; and
determine a 4-bit output based on the 4-bit running disparity and the 3-bit input portion, wherein the 6-bit output and the 4-bit output provide a 10-bit encoded output; and
receiving section that includes a receiver physical media attachment module and a receiver physical coding sub-layer module, wherein the receiver physical coding sub-layer module includes an 8b/10b decoding module.

13. The multi-gigabit transceiver of claim 12, wherein the 8b/10b encoding module further functions to determine the 6-bit running disparity by:
selecting the first possible 6-bit expected running disparity as the 6-bit running disparity when the input running disparity is in a first state and the 5-bit input portion is within a first set of values;
selecting the second possible 6-bit expected running disparity as the 6-bit running disparity when the input running disparity is in a second state and the 5-bit input portion is within the first set of values; and
setting the 6-bit running disparity to substantially equal the input running disparity when the 5-bit input portion is within a second set of values.

14. The multi-gigabit transceiver of claim 12, wherein the 8b/10b encoding module further functions to determine the 4-bit running disparity by:
selecting the first possible 4-bit expected running disparity as a first intermediate 4-bit expected running disparity when the first possible 6-bit expected running disparity is in a first state;
selecting the second possible 4-bit expected running disparity as the first intermediate 4-bit expected running disparity when the first possible 6-bit expected running disparity is in a second state;
selecting the first possible 4-bit expected running disparity as a second intermediate 4-bit expected running disparity when the second possible 6-bit expected running disparity is in a third state;
selecting the second possible 4-bit expected running disparity as the second intermediate 4-bit expected running disparity when the second possible 6-bit expected running disparity is in a fourth state;
selecting the first intermediate 4-bit expected running disparity as the 4-bit running disparity when the input running disparity is in a fifth state; and
selecting the second intermediate 4-bit expected running disparity as the 4-bit running disparity when the input running disparity is in a sixth state.

15. The multi-gigabit transceiver of claim 12, wherein the 8b/10b encoding module further functions to determine the 6-bit output by:
establishing the 6-bit output from the 5-bit input portion when the 5-bit input portion is of a value within a first set of values;
equating a first 6-bit value as the 6-bit output when the 6-bit running disparity is in a first state and the 5-bit input portion is of a value within a second set of values; and
equating a second 6-bit value as the 6-bit output when the 6-bit running disparity is in a second state and the 5-bit input portion is of a value within the second set of values.

16. The multi-gigabit transceiver of claim 12, wherein the 8b/10b encoding module further functions to determine the 4-bit output by:
establishing the 4-bit output from the 3-bit input portion when the 3-bit input portion is of a value within a first set of values;
equating a first 4-bit value as the 4-bit output when the 4-bit running disparity is in a first state and the 3-bit input portion is of a value within a second set of values; and
equating a second 4-bit value as the 4-bit output when the 4-bit running disparity is in a second state and the 3-bit input portion is of a value in the second set of values.

17. A multi-gigabit transceiver comprising:
a transmitting section that includes a transmitter physical media attachment module and a transmitter physical coding sub-layer module, wherein the transmitter physical coding sub-layer module includes a parallel 8b/10b encoding module that is operably coupled to:
receive an N-by-8-bit input;
perform, in parallel, 8b/10b encoding of N 8-bit input values of the N-by-8-bit input based on a plurality of running disparities for the N-by-8-bit input, wherein each of the N 8-bit input values includes a 5-bit input portion and a 3-bit input portion;
perform, in series, a running disparity calculation for each of the N 8-bit input values to produce the plurality of running disparities for the N-by-8-bit input, wherein the performing the running disparity calculation for one of the plurality of running disparities includes:
determine, in parallel, a 6-bit running disparity and a 4-bit running disparity, wherein the 6-bit running disparity is based on a first possible 6-bit expected running disparity, a second possible 6-bit expected running disparity, an input running disparity, and the 5-bit input portion, and wherein the 4-bit running disparity is based on the first possible 6-bit expected running disparity, the second possible 6-bit expected running disparity, a first possible 4-bit expected running disparity, a second possible 4-bit expected running disparity, the input running disparity, and the 3-bit input portion; and
a receiving section that includes a receiver physical media attachment module and a receiver physical coding sub-layer module, wherein the receiver physical coding sub-layer module includes an 8b/10b decoding module.

18. The multi-gigabit transceiver of claim 17, wherein the 8b/10b encoding module further functions to perform the 8b/10b encoding by, for each of the N 8-bit input values:

determining a 6-bit output based on the 6-bit running disparity and the 5-bit input portion; and determining a 4-bit output based on the 4-bit running disparity and the 3-bit input portion, wherein the 6-bit output and the 4-bit output provide a 10-bit encoded output.

19. The multi-gigabit transceiver of claim 18, wherein the 8b/10b encoding module further functions to determine the 6-bit output by:

establishing the 6-bit output from the 5-bit input portion when the 5-bit input portion is of a value within a first set of values;

equating a first 6-bit value as the 6-bit output when the 6-bit running disparity is in a first state and the 5-bit input portion is of a value within a second set of values; and equating a second 6-bit value as the 6-bit output when the 6-bit running disparity is in a second state and the 5-bit input portion is of a value within the second set of values.

20. The multi-gigabit transceiver of claim 18, wherein the 8b/10b encoding module further functions to determine the 4-bit output by:

establishing the 4-bit output from the 3-bit input portion when the 3-bit input portion is of a value within a first set of values;

equating a first 4-bit value as the 4-bit output when the 4-bit running disparity is in a first state and the 3-bit input portion is of a value within a second set of values; and equating a second 4-bit value as the 4-bit output when the 4-bit running disparity is in a second state and the 3-bit input portion is of a value within the second set of values.

21. The multi-gigabit transceiver of claim 17, wherein the 8b/10b encoding module further functions to determine the 6-bit running disparity by:

selecting the first possible 6-bit expected running disparity as the 6-bit running disparity when the input running disparity is in a first state and the 5-bit input portion is within a first set of values;

selecting the second possible 6-bit expected running disparity as the 6-bit running disparity when the input running disparity is in a second state and the 5-bit input portion is within the first set of values; and setting the 6-bit running disparity to substantially equal the input running disparity when the 5-bit input portion is within a second set of values.

22. The multi-gigabit transceiver of claim 17, wherein the 8b/10b encoding module further functions to determine the 4-bit running disparity by:

selecting the first possible 4-bit expected running disparity as a first intermediate 4-bit expected running disparity when the first possible 6-bit expected running disparity is in a first state;

selecting, the second possible 4-bit expected running disparity as the first intermediate 4-bit expected running disparity when the first possible 6-bit expected running disparity is in a second state;

selecting the first possible 4-bit expected running disparity as a second intermediate 4-bit expected running disparity when the second possible 6-bit expected running disparity is in a third state;

selecting the second possible 4-bit expected running disparity as the second intermediate 4-bit expected running disparity when the second possible 6-bit expected running disparity is in a fourth state;

selecting the first intermediate 4-bit expected running disparity as the 4-bit running disparity when the input running disparity is in a fifth state; and selecting the second intermediate 4-bit expected running disparity as the 4-bit running disparity when the input running disparity is in a sixth state.

23. A method for decoding an 8b/10b encoded data word, the method comprising:

receiving a 10-bit encoded data word having a 6-bit portion and a 4-bit portion;

receiving a running disparity;

determining, in parallel, a 6-bit running disparity and a 4-bit running disparity, wherein the 6-bit running disparity is based on a first possible 6-bit expected running disparity, a second possible 6-bit expected running disparity, the running disparity, and the 6-bit portion, and wherein the 4-bit running disparity is based on the first possible 6-bit expected running disparity, the second possible 6-bit expected running disparity, a first possible 4-bit expected running disparity, a second possible 4-bit expected running disparity, the input running disparity, and the 4-bit portion;

determining a 5-bit decoded value based on the 6-bit running disparity and the 6-bit portion; and determining a 3-bit decoded value based on the 4-bit running disparity and the 4-bit portion, wherein the 5-bit decoded value and the 3-bit decoded value provide an 8-bit decoded value.

24. The method of claim 23, wherein the determining the 6-bit running disparity further comprises:

selecting the first possible 6-bit expected running disparity as the 6-bit running disparity when the input running disparity is in a first state and the 6-bit portion is within a first set of values;

selecting the second possible 6-bit expected running disparity as the 6-bit running disparity when the input running disparity is in a second state and the 6-bit portion is within the first set of values; and setting the 6-bit running disparity to substantially equal the input running disparity when the 6-bit portion is within a second set of values.

25. The method of claim 23, wherein the determining the 4-bit running disparity further comprises:

selecting the first possible 4-bit expected running disparity as a first intermediate 4-bit expected running disparity when the first possible 6-bit expected running disparity is in a first state;

selecting the second possible 4-bit expected running disparity as the first intermediate 4-bit expected running disparity when the first possible 6-bit expected running disparity is in a second state;

selecting the first possible 4-bit expected running disparity as a second intermediate 4-bit expected running disparity when the second possible 6-bit expected running disparity is in a third state;

selecting the second possible 4-bit expected running disparity as the second intermediate 4-bit expected running disparity when the second possible 6-bit expected running disparity is in a fourth state;

selecting the first intermediate 4-bit expected running disparity as the 4-bit running disparity when the input running disparity is in a fifth state; and selecting the second intermediate 4-bit expected running disparity as the 4-bit running disparity when the input running disparity is in a sixth state.

26. The method of claim 23, wherein the determining the 5-bit decoded value further comprises:

establishing the 5-bit decoded value from the 6-bit portion when the 6-bit portion is of a value within a first set of values;

equating a first 5-bit value as the 5-bit decoded value when the 6-bit running disparity is in a first state and the 6-bit portion is of a value within a second set of values; and equating a second 5-bit value as the 5-bit decoded value when the 6-bit running disparity is in a second state and the 6-bit portion is of a value, within the second set of values.

27. The method of claim 23, wherein the determining the 3-bit decoded further comprises:

establishing the 3-bit decoded value from the 4-bit portion when the 4-bit portion is of a value within a first set of values;

equating a first 3-bit value as the 3-bit decoded value when the 4-bit running disparity is in a first state and the 4-bit portion is of a value within a second set of values; and equating a second 3-bit value as the 3-bit decoded when the 4-bit running disparity is in a second state and the 4-bit portion is of a value within the second set of values.

28. A method for parallel 8b/10b decoding, the method comprising:

receiving an encoded N-by-10-bit input;

performing, in parallel, 8b/10b decoding of N 10-bit input values of the encoded N-by-10-bit input based on a plurality of running disparities for the encoded N-by-10-bit input, wherein each of the N 10-bit input values includes a 6-bit portion and a 4-bit portion;

performing, in series, a running, disparity calculation for each of the N 10-bit input values to produce the plurality of running disparities for the encoded N-by-10-bit input, wherein the performing the running disparity calculation for one of the plurality of running disparities includes:

determining, in parallel, a 6-bit running disparity and a 4-bit running disparity, wherein the 6-bit running disparity is based on a first possible 6-bit expected running disparity, a second possible 6-bit expected running disparity, an input running disparity, and the 6-bit portion, and wherein the 4-bit running disparity is based on the first possible 6-bit expected running disparity, the second possible 6-bit expected running disparity, a first possible 4-bit expected running disparity, a second possible 4-bit expected running disparity, the input running disparity, and the 4-bit portion.

29. The method of claim 28, wherein the performing the 8b/10b decoding further comprises, for each of the N 10-bit input values:

determining a 5-bit decoded value based on the 6-bit running disparity and the 6-bit portion; and determining a 3-bit decoded value based on the 4-bit running disparity and the 4-bit portion, wherein the 5-bit decoded value and the 3-bit decoded value provide an 8-bit decoded output.

30. The method of claim 29, wherein the determining the 5-bit decoded value further comprises:

establishing the 5-bit decoded value from the 6-bit portion when the 6-bit portion is of a value within a first set of values;

equating a first 5-bit value as the 5-bit decoded value when the 6-bit running disparity is in a first state and the 6-bit portion is of a value within a second set of values; and equating a second 5-bit value as the 5-bit decoded value when the 6-bit running disparity is in a second state and the 6-bit portion is of a value within the second set of values.

31. The method of claim 29, wherein the determining the 3-bit decoded value further comprises:

establishing the 3-bit decoded value from the 4-bit portion when the 4-bit portion is of a value within a first set of values;

equating a first 3-bit value as the 3-bit decoded value when the 4-bit running disparity is in a first state and the 4-bit portion is of a value within a second set of values; and equating a second 3-bit value as the 3-bit decoded value when the 4-bit running disparity is in a second state and the 4-bit portion is of a value within the second set of values.

32. The method of claim 28, wherein the determining the 6-bit running disparity further comprises:

selecting the first possible 6-bit expected running disparity as the 6-bit running disparity when the input running disparity is in a first state and the 6-bit portion is within a first set of values;

selecting the second possible 6-bit expected running disparity as the 6-bit running disparity when the input running disparity is in a second state and the 6-bit portion is within the first set of values; and setting the 6-bit running disparity to substantially equal the input running disparity when the 6-bit portion is within a second set of values.

33. The method of claim 28, wherein the determining the 4-bit running disparity further comprises:

selecting the first possible 4-bit expected running disparity as a first intermediate 4-bit expected running disparity when the first possible 6-bit expected running disparity is in a first state;

selecting the second possible 4-bit expected running disparity as the first intermediate 4-bit expected running disparity when the first possible 6-bit expected running disparity is in a second state;

selecting the first possible 4-bit expected running disparity as a second intermediate 4-bit expected running disparity when the second possible 6-bit expected running disparity is in a third state;

selecting the second possible 4-bit expected running disparity as the second intermediate 4-bit expected running disparity when the second possible 6-bit expected running disparity is in a fourth state;

selecting the first intermediate 4-bit expected running disparity as the 4-bit running disparity when the input running disparity is in a fifth state; and selecting the second intermediate 4-bit expected running disparity as the 4-bit running disparity when the input running disparity is in a sixth state.

34. A multi-gigabit transceiver comprises:

a transmitting section that includes a transmitter physical media attachment module and a transmitter physical coding sub-layer module, wherein the transmitter physical coding sub-layer module includes a parallel 8b/10b encoding module; and a receiving section that includes a receiver physical media attachment module and a receiver physical coding sub-layer module, wherein the receiver physical coding sub-layer module includes an 8b/10b decoding module that is operably coupled to:

receive a 10-bit encoded data word having a 6-bit portion and a 4-bit portion;

receive a running disparity;

determining, in parallel, a 6-bit running disparity and a 4-bit running disparity, wherein the 6-bit running disparity is based on a first possible 6-bit expected running disparity, a second possible 6-bit expected running disparity, the running disparity, and the 6-bit portion, and wherein the 4-bit running disparity is based on the first possible 6-bit expected running disparity, the second possible 6-bit expected running disparity, a first possible 4-bit expected running disparity, a second possible 4-bit expected running disparity, the input running disparity, and the 4-bit portion;

determine a 5-bit decoded value based on the 6-bit running disparity and the 6-bit-portion; and determine a 3-bit decoded value based on the 4-bit running disparity and the 4-bit portion, wherein the 5-bit decoded value and the 3-bit decoded value provide an 8-bit decoded value.

35. The multi-gigabit transceiver of claim 34, wherein the 8b/10b decoding module further functions to determine the 6-bit running disparity by:

selecting the first possible 6-bit expected running disparity as the 6-bit running disparity when the input running disparity is in a first state and the 6-bit portion is within a first set of values;

selecting the second possible 6-bit expected running disparity as the 6-bit running disparity when the input running disparity is in a second state and the 6-bit portion is within the first set of values; and setting the 6-bit running disparity to substantially equal the input running disparity when the 6-bit portion is within a second set of values.

36. The multi-gigabit transceiver of claim 34, wherein the 8b/10b decoding module further functions to determine the 4-bit running disparity by:

selecting the first possible 4-bit expected running disparity as a first intermediate 4-bit expected running disparity when the first possible 6-bit expected running disparity is in a first state;

selecting the second possible 4-bit expected running disparity as the first intermediate 4-bit expected running disparity when the first possible 6-bit expected running disparity is in a second state;

selecting the first possible 4-bit expected running disparity as a second intermediate 4-bit expected running disparity when the second possible 6-bit expected running disparity is in a third state;

selecting the second possible 4-bit expected running disparity as the second intermediate 4-bit expected running disparity when the second possible 6-bit expected running disparity is in a fourth state;

selecting the first intermediate 4-bit expected running disparity as the 4-bit running disparity when the input running disparity is in a fifth state; and selecting the second intermediate 4-bit expected running disparity as the 4-bit running disparity when the input running disparity is in a sixth state.

37. The multi-gigabit transceiver of claim 34, wherein the 8b/10b decoding module further functions to determining the 5-bit decoded value by:

establishing the 5-bit decoded value from the 6-bit portion when the 6-bit portion is of a value within a first set of values;

equating a first 5-bit value as the 5-bit decoded value when the 6-bit running disparity is in a first state and the 6-bit portion is of a value within a second set of values; and equating a second 5-bit value as the 5-bit decoded value when the 6-bit running disparity is in a second state and the 6-bit portion is of a value within the second set of values.

38. The multi-gigabit transceiver of claim 34, wherein the 8b/10b decoding module further functions to determine the 3-bit decoded by:

establishing the 3-bit decoded value from the 4-bit portion when the 4-bit portion is of a value within a first set of values;

equating a first 3-bit value as the 3-bit decoded value when the 4-bit running disparity is in a first state and the 4-bit portion is of a value within a second set of values; and equating a second 3-bit value as the 3-bit decoded when the 4-bit running disparity is in a second state and the 4-bit portion is of a value within the second set of values.

39. A multi-gigabit transceiver comprises:

a transmitting section that includes a transmitter physical media attachment module and a transmitter physical coding sub-layer module, wherein the transmitter physical coding sub-layer module includes a parallel 8b/10b encoding module; and a receiving section that includes a receiver physical media attachment module and a receiver physical coding sub-layer module, wherein the receiver physical coding sub-layer module includes an 8b/10b decoding module that is operably coupled to:

receive an encoded N-by-10-bit input;

perform, in parallel, 8b/10b decoding of N 10-bit input values of the encoded N-by-10-bit input based on a plurality of running disparities for the encoded N-by-10-bit input, wherein each of the N 10-bit input values includes a 6-bit portion and a 4-bit portion;

perform, in series, a running disparity calculation for each of the N 10-bit input values to produce the plurality of running disparities for the encoded N-by-10-bit input, wherein the performing the running disparity calculation for one of the plurality of running disparities includes:

determining, in parallel, a 6-bit running disparity and a 4-bit running disparity, wherein the 6-bit running disparity is based on a first possible 6-bit expected running disparity, a second possible 6-bit expected running disparity, an input running disparity, and the 6-bit portion, and wherein the 4-bit running disparity is based on the first possible 6-bit expected running disparity, the second possible 6-bit expected running disparity, a first possible 4-bit expected running disparity, a second possible 4-bit expected running disparity, the input running disparity, and the 4-bit portion.

40. The multi-gigabit transceiver of claim 39, wherein the 8b/10b decoding module further functions to performing the 8b/10b decoding by, for each of the N 10-bit input values:

determining a 5-bit decoded value based on the 6-bit running disparity and the 6-bit portion; and determining a 3-bit decoded value based on the 4-bit running disparity and the 4-bit portion, wherein the 5-bit decoded value and the 3-bit decoded value provide an 8-bit decoded output.

41. The multi-gigabit transceiver of claim 40, wherein the 8b/10b decoding module further functions to determine the 5-bit decoded value by:

establishing the 5-bit decoded value from the 6-bit portion when the 6-bit portion is of a value within a first set of values;

equating a first 5-bit value as the 5-bit decoded value when the 6-bit running disparity is in a first state and the 6-bit portion is of a value within a second set of values; and equating a second 5-bit value as the 5-bit decoded value when the 6-bit running disparity is within a second state and the 6-bit portion is of a value in the second set of values.

42. The multi-gigabit transceiver of claim 40, wherein the 8b/10b decoding module further functions to determine the 3-bit decoded value further comprises:

establishing the 3-bit decoded value from the 4-bit portion when the 4-bit portion is of a value within a first set of values;

equating a first 3-bit value as the 3-bit decoded value when the 4-bit running disparity is in a first state and the 4-bit portion is of a value within a second set of values; and equating a second 3-bit value as the 3-bit decoded value when the 4-bit running disparity is in a second state and the 4-bit portion is of a value within the second set of values.

43. The multi-gigabit transceiver of claim 39, wherein the 8b/10b decoding module further functions to determine the 6-bit running disparity by:

selecting the first possible 6-bit expected running disparity as the 6-bit running disparity when the input running disparity is in a first state and the 6-bit portion is within a first set of values;

selecting the second possible 6-bit expected running disparity as the 6-bit running disparity when the input running disparity is in a second state and the 6-bit portion is within the first set of values; and setting the 6-bit running disparity to substantially equal the input running disparity when the 6-bit portion is within a second set of values.

44. The multi-gigabit transceiver of claim 39, wherein the 8b/10b decoding module further functions to determine the 4-bit running disparity by:

selecting the first possible 4-bit expected running disparity as a first intermediate 4-bit expected running disparity when the first possible 6-bit expected running disparity is in a first state;

selecting the second possible 4-bit expected running disparity as the first intermediate 4-bit expected running disparity when the first possible 6-bit -expected running disparity is in a second state;

selecting the first possible 4-bit expected running disparity as a second intermediate 4-bit expected running disparity when the second possible 6-bit expected running disparity is in a third state;

selecting the second possible 4-bit expected running disparity as the second intermediate 4-bit expected running disparity when the second possible 6-bit expected running disparity is in a fourth state;

selecting the first intermediate 4-bit expected running disparity as the 4-bit running disparity when the input running disparity is in a fifth state; and selecting the second intermediate 4-bit expected running disparity as the 4-bit running disparity when the input running disparity is in a sixth state.

45. A method for encoding/decoding, the method comprising:

receiving an input running disparity;

receiving an (M+N)-bit input that includes a M-bit input portion and a N-bit input portion, wherein M and N are integers;

determining, in parallel, an X-bit running disparity and a Y-bit running disparity, wherein the X-bit running disparity is based on a first possible X-bit expected running disparity, a second possible X-bit expected running disparity, the input running disparity, and the M-bit input portion, and wherein the Y-bit running disparity is based on the first possible X-bit expected running disparity, the second possible X-bit expected running disparity, a first possible Y-bit expected running disparity, a second possible Y-bit expected running disparity, the input running disparity, and the N-bit input portion;

determining a X-bit output based on the X-bit running disparity and the M-bit input portion; and determining a Y-bit output based on the Y-bit running disparity and the N-bit input portion, wherein the X-bit output and the Y-bit output provide a (X+Y)-bit encoded output;

wherein X is an integer greater than M, and Y is an integer greater than N.

* * * * *